(12) United States Patent
McCoy et al.

(10) Patent No.: US 11,651,179 B2
(45) Date of Patent: May 16, 2023

(54) OPTICAL ARTICLES AND SYSTEMS INTERACTING WITH THE SAME

(71) Applicant: 3M INNOVATIVE PROPERTIES COMPANY, St. Paul, MN (US)

(72) Inventors: Michael A. McCoy, St. Paul, MN (US); Glenn E. Casner, Woodbury, MN (US); Anne C. Gold, South St. Paul, MN (US); Silvia Geciova-Borovova Guttmann, St. Paul, MN (US); Charles A. Shaklee, Stillwater, MN (US); Robert W. Shannon, Stillwater, MN (US); Gautam Singh, Woodbury, MN (US); Guruprasad Somasundaram, St. Paul, MN (US); Andrew H. Tilstra, Shoreview, MN (US); John A. Wheatley, Stillwater, MN (US); Caroline M. Ylitalo, Stillwater, MN (US); Arash Sangari, Frisco, TX (US); Alexandra R. Cunliffe, St. Paul, MN (US); Jonathan D. Gandrud, Woodbury, MN (US); Kui Chen-Ho, Woodbury, MN (US); Travis L. Potts, Woodbury, MN (US); Maja Giese, Erkelenz (DE); Andreas M. Geldmacher, Dormagen (DE); Katja Hansen, Düsseldorf (DE); Markus G. W. Lierse, Moenchengladbach (DE); Neeraj Sharma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/486,311

(22) PCT Filed: Sep. 27, 2017

(86) PCT No.: PCT/US2017/053632
§ 371 (c)(1),
(2) Date: Aug. 15, 2019

(87) PCT Pub. No.: WO2018/151759
PCT Pub. Date: Aug. 23, 2018

(65) Prior Publication Data
US 2019/0391304 A1    Dec. 26, 2019

Related U.S. Application Data

(60) Provisional application No. 62/536,654, filed on Jul. 25, 2017, provisional application No. 62/461,041, filed on Feb. 20, 2017.

(51) Int. Cl.
*G06K 19/06* (2006.01)
*G02B 5/12* (2006.01)
(Continued)

(52) U.S. Cl.
CPC ......... *G06K 19/06037* (2013.01); *G02B 5/12* (2013.01); *G02B 5/124* (2013.01);
(Continued)

(58) Field of Classification Search
CPC ... G06K 19/06037; G06K 7/14; G06K 7/1417
(Continued)

(56) References Cited

U.S. PATENT DOCUMENTS

| | | |
|---|---|---|
| 3,709,580 A | 1/1973 | Fugitt |
| 3,887,268 A | 6/1975 | Golden |

(Continued)

FOREIGN PATENT DOCUMENTS

| | | |
|---|---|---|
| AU | 80187-87 | 5/1988 |
| CA | 2000405 | 4/1990 |

(Continued)

OTHER PUBLICATIONS

Dalal, "Histograms of Oriented Gradients for Human Detection", 2005 IEEE Computer Society Conference on Computer Vision and Pattern Recognition (CVPR'05)—San Diego, Jun. 2005, 8 pages.
(Continued)

*Primary Examiner* — Ahshik Kim
(74) *Attorney, Agent, or Firm* — Steven A. Bern

(57) ABSTRACT

The present disclosure includes in one instance an optical article comprising a data rich plurality of retroreflective (Continued)

Simple base pattern    Base pattern with one replicate

An object partially occluding    Due to the replicate, in this
half of base pattern    example one example of the
base pattern remains visible meats that are configured in a spatially defined arrangement, where the plurality of retroreflective elements comprise retroreflective elements having at least two different retroreflective properties, and where data rich means information that is readily machine interpretable. The present disclosure also includes a system comprising the previously mentioned optical article, an optical system, and an inference engine for interpreting and classifying the plurality of retroreflective elements wherein the optical system feeds data to the inference engine.

10 Claims, 22 Drawing Sheets

(51) Int. Cl.
    *G02B 5/124*    (2006.01)
    *G02B 5/30*    (2006.01)

(52) U.S. Cl.
    CPC ............ *G02B 5/305* (2013.01); *G02B 5/3025* (2013.01); *G06K 2019/0629* (2013.01)

(58) Field of Classification Search
    USPC ........................................................ 235/494
    See application file for complete search history.

(56) References Cited

U.S. PATENT DOCUMENTS

| | | |
|---|---|---|
| 3,894,790 A | 7/1975 | Golden |
| 4,244,683 A | 1/1981 | Rowland |
| 4,361,911 A | 11/1982 | Buser |
| 4,618,518 A | 10/1986 | Pricone |
| 4,672,089 A | 6/1987 | Pricone |
| 4,835,720 A | 5/1989 | Ditto |
| 4,950,525 A | 8/1990 | Bailey |
| 5,023,597 A | 6/1991 | Salisbury |
| 5,153,928 A | 10/1992 | Lizuka |
| 5,495,097 A | 2/1996 | Katz |
| 5,565,669 A | 10/1996 | Liu |
| 5,656,360 A | 8/1997 | Faykish |
| 5,889,615 A | 3/1999 | Dreyer |
| 5,902,988 A | 5/1999 | Durbin |
| D413,731 S | 9/1999 | Hannington |
| 5,948,488 A | 9/1999 | Marecki |
| 5,988,505 A | 11/1999 | Shellhammer |
| 6,010,223 A | 1/2000 | Gubela, Sr. |
| 6,097,839 A | 8/2000 | Liu |
| 6,153,128 A | 11/2000 | Lightle |
| 6,253,477 B1 | 7/2001 | Balint |
| 6,360,949 B1 | 3/2002 | Shepard |
| 6,595,420 B1 | 7/2003 | Wilz, Sr. |
| D480,879 S | 10/2003 | Boehm |
| 6,674,878 B2 | 1/2004 | Ratterath |
| 6,832,728 B2 | 12/2004 | Kennedy |
| 6,890,634 B1* | 5/2005 | Yoon ...................... G02B 5/124 |
| | | 359/515 |
| 7,045,766 B2 | 5/2006 | Majima |
| 7,110,618 B2 | 9/2006 | Bobrov |
| 7,140,741 B2 | 11/2006 | Fleming |
| 7,263,217 B2 | 8/2007 | Kawaike |
| 7,387,393 B2 | 6/2008 | Reich |
| 7,505,620 B2 | 3/2009 | Braune |
| 7,661,596 B1 | 2/2010 | Spitz |
| 7,720,259 B2 | 5/2010 | Gordon |
| 7,756,411 B2 | 7/2010 | Tanaka |
| 7,783,443 B2 | 8/2010 | Aratani |
| 7,874,490 B2 | 1/2011 | Thomas, III |
| 8,113,434 B2 | 2/2012 | Thomas, III |
| 8,126,640 B2 | 2/2012 | Winner |
| 8,195,394 B1 | 6/2012 | Zhu |
| 8,208,681 B2 | 6/2012 | Heller |
| 8,279,277 B2 | 10/2012 | Nam |
| 8,294,580 B2 | 10/2012 | Witwer |
| 8,320,634 B2 | 11/2012 | Deutsch |
| 8,330,823 B2 | 12/2012 | Gordon |
| 8,456,308 B2 | 6/2013 | Nelson |
| 8,470,394 B2 | 6/2013 | Koppes |
| 8,493,502 B2 | 7/2013 | Manabe |
| 8,584,950 B2 | 11/2013 | Endo |
| 8,622,555 B2 | 1/2014 | Krishnan |
| 8,659,668 B2 | 2/2014 | Cotter |
| 8,660,311 B2 | 2/2014 | Retterath |
| 8,780,034 B2 | 7/2014 | Kimura |
| 8,842,019 B2 | 9/2014 | Boccola |
| 8,851,688 B2 | 10/2014 | Huang |
| 8,988,638 B2 | 3/2015 | Jiang |
| 9,070,057 B2 | 6/2015 | Hamilton |
| 9,143,843 B2 | 9/2015 | De Luca |
| 9,248,470 B2 | 2/2016 | Koppes |
| 9,349,043 B2 | 5/2016 | Ryu |
| 9,401,024 B2 | 7/2016 | Kwiatkowski |
| 9,430,708 B2 | 8/2016 | Han |
| 9,471,863 B2 | 10/2016 | Fleming |
| 9,519,087 B2 | 12/2016 | Nakajima |
| 9,562,998 B2* | 2/2017 | Edmonds ............... G02B 5/208 |
| 10,417,541 B1 | 9/2019 | Mishra |
| 2001/0012153 A1 | 8/2001 | Halter |
| 2002/0039184 A1 | 4/2002 | Sandusky |
| 2002/0134839 A1 | 9/2002 | Iwaki |
| 2003/0001019 A1 | 1/2003 | Corby, Jr. |
| 2003/0138133 A1 | 7/2003 | Nagaoka |
| 2003/0150043 A1 | 8/2003 | Koppes |
| 2003/0193717 A1 | 10/2003 | Gubela |
| 2004/0257627 A1 | 12/2004 | Mclurg |
| 2005/0023352 A1 | 2/2005 | Patel |
| 2005/0063565 A1 | 3/2005 | Nagaoka |
| 2005/0111698 A1 | 5/2005 | Kawai |
| 2005/0119779 A1 | 6/2005 | Amico |
| 2006/0027661 A1 | 2/2006 | Hosoi |
| 2006/0140485 A1 | 6/2006 | Hing |
| 2007/0023523 A1 | 2/2007 | Onishi |
| 2007/0222565 A1 | 9/2007 | Kawamata |
| 2008/0000976 A1 | 1/2008 | Thomas |
| 2008/0017717 A1 | 1/2008 | Miyazaki |
| 2008/0085033 A1* | 4/2008 | Haven .................. G06K 9/3216 |
| | | 382/103 |
| 2008/0112596 A1* | 5/2008 | Rhoads .............. G06K 9/00456 |
| | | 382/115 |
| 2009/0161918 A1 | 6/2009 | Heller |
| 2009/0208065 A1 | 8/2009 | Miura |
| 2009/0279738 A1 | 11/2009 | Sasaki |
| 2010/0147949 A1 | 6/2010 | Sakuma |
| 2010/0151213 A1 | 6/2010 | Smithson |
| 2010/0245554 A1 | 9/2010 | Nam |
| 2011/0007950 A1 | 1/2011 | Deutsch |
| 2011/0228089 A1 | 9/2011 | Almeida |
| 2011/0228392 A1* | 9/2011 | Yang ...................... G02B 5/124 |
| | | 359/530 |
| 2011/0228393 A1* | 9/2011 | Caswell ............... G02B 21/367 |
| | | 359/530 |
| 2012/0061469 A1 | 3/2012 | Sonoda |
| 2012/0081214 A1 | 4/2012 | Alan |
| 2012/0146789 A1 | 6/2012 | De Luca |
| 2012/0314071 A1 | 12/2012 | Rosenbaum |
| 2013/0075473 A1 | 3/2013 | Wang |
| 2013/0147938 A1 | 6/2013 | McCloskey |
| 2013/0257622 A1 | 10/2013 | Davalos |
| 2013/0265331 A1 | 10/2013 | Wu |
| 2013/0274587 A1 | 10/2013 | Coza |
| 2013/0282609 A1 | 10/2013 | Au |
| 2013/0329988 A1 | 12/2013 | Levi |
| 2014/0307076 A1 | 10/2014 | Deutsch |
| 2014/0368661 A1 | 12/2014 | Angot |
| 2015/0029012 A1 | 1/2015 | Mitani |
| 2015/0131856 A1 | 5/2015 | Matsunaga |
| 2015/0199018 A1 | 7/2015 | Kim |
| 2015/0294130 A1* | 10/2015 | Stein ................. G06K 19/0614 |
| | | 235/462.09 |
| 2015/0332463 A1 | 11/2015 | Galera |
| 2016/0012301 A1 | 1/2016 | Arndt |
| 2016/0054496 A1 | 2/2016 | Ichihashi |

(56) References Cited

U.S. PATENT DOCUMENTS

| | | |
|---|---|---|
| 2016/0102432 A1 | 4/2016 | Chen |
| 2016/0106174 A1 | 4/2016 | Chung |
| 2016/0162747 A1 | 6/2016 | Singh |
| 2016/0252611 A1 | 9/2016 | Guecker |
| 2016/0265762 A1 | 9/2016 | Yoshida |
| 2016/0275326 A1 | 9/2016 | Falkenstern |
| 2017/0083775 A1 | 3/2017 | Grauer |
| 2017/0368381 A1 | 12/2017 | Awiszus |
| 2017/0372216 A1 | 12/2017 | Awiszus |
| 2017/0372607 A1 | 12/2017 | Janovec |
| 2017/0374436 A1 | 12/2017 | Awiszus |
| 2018/0108236 A1 | 4/2018 | Kanukurthy |
| 2018/0197052 A1 | 7/2018 | Yanson |
| 2019/0037934 A1 | 2/2019 | Swank |
| 2019/0306385 A1* | 10/2019 | Sharma ............. B42D 25/333 |
| 2020/0042849 A1* | 2/2020 | Howard ........... G06K 19/06037 |
| 2020/0046040 A1 | 2/2020 | Kanukurthy |
| 2020/0279116 A1 | 9/2020 | Ylitalo |

FOREIGN PATENT DOCUMENTS

| | | |
|---|---|---|
| CA | 2020748 | 2/1991 |
| CA | 2252433 | 3/2006 |
| CA | 2880914 | 2/2014 |
| CA | 2938784 | 1/2019 |
| CN | 101105817 | 1/2008 |
| CN | 102004012811 | 2/2009 |
| CN | 102693427 | 9/2012 |
| CN | 102012106673 | 5/2014 |
| CN | 102013206915 | 10/2014 |
| CN | 104424201 | 3/2015 |
| CN | 104635286 | 5/2015 |
| CN | 204719258 | 10/2015 |
| CN | 106056120 | 10/2016 |
| CN | 106022375 | 7/2019 |
| CN | 106056132 | 9/2019 |
| EP | 0416742 | 3/1991 |
| EP | 0498499 | 8/1992 |
| EP | 0789314 | 8/1997 |
| EP | 0944018 | 9/1999 |
| EP | 1246118 | 10/2002 |
| EP | 1417634 | 5/2004 |
| EP | 1860594 | 11/2007 |
| EP | 1897751 | 3/2008 |
| EP | 1975650 | 10/2008 |
| EP | 2081131 | 7/2009 |
| EP | 2110035 | 10/2009 |
| EP | 2233818 | 9/2010 |
| EP | 2602740 | 6/2013 |
| EP | 2653772 | 10/2013 |
| EP | 2916147 | 9/2015 |
| EP | 2919150 | 9/2015 |
| EP | 3089003 | 11/2016 |
| EP | 3229047 | 10/2017 |
| FR | 2848167 | 6/2004 |
| GB | 2127344 | 4/1984 |
| GB | 2286152 | 8/1995 |
| GB | 2383222 | 6/2003 |
| GB | 2443664 | 5/2008 |
| IL | 75659 | 5/1990 |
| JP | 07223487 | 8/1995 |
| JP | 07223488 | 8/1995 |
| JP | 08122062 | 5/1996 |
| JP | H09134498 | 5/1997 |
| JP | 2580396 | 9/1998 |
| JP | H11272849 | 10/1999 |
| JP | 11328364 | 11/1999 |
| JP | 2003-288600 | 10/2003 |
| JP | 2003-302470 | 10/2003 |
| JP | 2004-145660 | 5/2004 |
| JP | 2005-309797 | 11/2005 |
| JP | 2006-134339 | 5/2006 |
| JP | 2007-072665 | 3/2007 |
| JP | 2007-093629 | 4/2007 |
| JP | 2007-156832 | 6/2007 |
| JP | 2007-308110 | 11/2007 |
| JP | 2008-070898 | 3/2008 |
| JP | 2008-238927 | 10/2008 |
| JP | 2009-020813 | 1/2009 |
| JP | 2010-015235 | 1/2010 |
| JP | 2012-195018 | 10/2012 |
| JP | 2012195018 | 10/2012 |
| SE | 201400134 | 10/2015 |
| WO | WO 1995-034043 | 12/1995 |
| WO | WO 1997-041466 | 11/1997 |
| WO | WO 1998-044202 | 10/1998 |
| WO | WO 1999-032940 | 7/1999 |
| WO | WO 1999-059271 | 11/1999 |
| WO | WO 2000-072275 | 11/2000 |
| WO | WO 2001-077721 | 10/2001 |
| WO | WO 2003-017184 | 2/2003 |
| WO | WO 2006-014974 | 2/2006 |
| WO | WO 2006-098954 | 9/2006 |
| WO | WO 2006-125224 | 11/2006 |
| WO | WO 2006-129249 | 12/2006 |
| WO | WO 2007-020666 | 2/2007 |
| WO | WO 2007-030530 | 3/2007 |
| WO | WO 2008-014090 | 1/2008 |
| WO | WO 2008-014831 | 2/2008 |
| WO | WO 2008-107987 | 9/2008 |
| WO | WO 2008-149923 | 12/2008 |
| WO | WO 2009-055738 | 4/2009 |
| WO | WO 2009-075987 | 6/2009 |
| WO | WO 2009-118197 | 10/2009 |
| WO | WO 2010-037158 | 4/2010 |
| WO | WO 2011-005222 | 1/2011 |
| WO | WO 2011-036414 | 3/2011 |
| WO | WO 2011-076200 | 6/2011 |
| WO | WO 2011-118540 | 9/2011 |
| WO | WO 2011-123741 | 10/2011 |
| WO | WO 2011-124483 | 10/2011 |
| WO | WO 2011-152843 | 12/2011 |
| WO | WO 2011-152844 | 12/2011 |
| WO | WO 2012-100082 | 7/2012 |
| WO | WO 2013-129352 | 9/2013 |
| WO | WO 2013-135608 | 9/2013 |
| WO | WO 2013-149142 | 10/2013 |
| WO | WO 2013-179588 | 12/2013 |
| WO | WO 2014-196171 | 12/2014 |
| WO | WO 2015-100284 | 7/2015 |
| WO | WO 2015-146414 | 10/2015 |
| WO | WO 2015-148426 | 10/2015 |
| WO | WO 2015-149009 | 10/2015 |
| WO | WO 2015-171406 | 11/2015 |
| WO | WO 2015-175024 | 11/2015 |
| WO | WO 2015-191132 | 12/2015 |
| WO | WO 2016-025207 | 2/2016 |
| WO | WO 2016-053734 | 4/2016 |
| WO | WO 2016-109620 | 7/2016 |
| WO | WO 2017-034968 | 3/2017 |
| WO | WO 2017-223451 | 12/2017 |
| WO | WO 2017-223459 | 12/2017 |
| WO | WO 2017-223469 | 12/2017 |
| WO | WO 2018-064089 | 4/2018 |
| WO | WO 2018-064198 | 4/2018 |
| WO | WO 2018-064203 | 4/2018 |
| WO | WO 2018-064212 | 4/2018 |
| WO | WO 2018-151761 | 8/2018 |
| WO | WO 2019-084302 | 2/2019 |
| WO | WO 2019-064108 | 4/2019 |

OTHER PUBLICATIONS

"Decision Tree", Wikipedia, [retrieved from the internet on Sep. 27, 2019], URL <http://en.wikipedia.org/wiki/Decision_tree>, 5 pages.
Felzenszwald, "Object Detection with Discriminatively Trained Part Based Models", IEEE Transactions on Pattern Analysis and Machine Intelligence, Sep. 2010, vol. 32, No. 9, pp. 1627-1645.
"K-Nearest Neighbors Algorithm", Wikipedia, [retrieved from the internet on Sep. 27, 2019], URL <http://en.wikipedia.org/wiki/K-nearest_neighbors_algorithm>, 11 pages.

(56) References Cited

OTHER PUBLICATIONS

"Linear Discriminant Analysis", Wikipedia, [retrieved from the internet on Sep. 27, 2019], URL <http://en.wikipedia.org/wiki/Linear_discriminant_analysis>, 12 pages.

Mori, "Efficient Shape Matching Using Shape Contexts", IEEE Transactions on Pattern Analysis and Machine Intelligence, Nov. 2005, vol. 27, No. 11, pp. 1832-1837.

Mosberger, "A Customized Vision System for Tracking Humans Wearing Reflective Safety Clothing from Industrial Vehicles and Machinery", Sensors, Sep. 2014, vol. 14, No. 10, pp. 17952-17980.

Mosberger, "Multi-band Hough Forest for Detecting Humans with Reflective Safety Clothing from Mobile Machinery", 2015 IEEE International Conference on Robotics and Automation (ICRA)—Seattle, May 2015, pp. 697-703.

Nakazato, "Localization of Wearable Users Using Visible Retro-reflective Markers and an IR Camera", Electronic Imaging 2005—San Jose California, Mar. 2015, Proceedings vol. 5664—Stereoscopic Displays and Virtual Reality Systems XII, 8 pages.

Nota, "Augmenting Real-world Objects by Detecting "Invisible" Visual Markers", UIST '08—Adjunct Proceedings of the 21th annual ACM Symposium on User Interface Software and Technology—Monterey California, Oct. 2008, 2 pages.

"Quadratic Classifier" Wikipedia, [retrieved from the internet on Sep. 27, 2019], URL <http://en.wikipedia.org/wiki/Quadratic_classifier>, 3 pages.

"Random Forest", Wikipedia, [retrieved from the internet on Sep. 27, 2019], URL <http://en.wikipedia.org/wiki/Random_forest>, 6 pages.

Rozantsev, "On Rendering Synthetic Images for Training an Object Detector", Computer Vision and Image Understanding, Aug. 2015, vol. 137, pp. 24-37.

"Support-Vector Machine", Wikipedia, [retrieved from the internet on Sep. 27, 2019], URL <http://en.wikipedia.org/wiki/Support_vector_machine>, 15 pages.

Toshev, "Shape-Based Object Detection via Boundary Structure Segmentation", International Journal of Computer Vision, Sep. 2012, vol. 99, No. 2, pp. 123-146.

International Search Report for PCT International Application No. PCT/US2017/053632, dated Aug. 12, 2017, 5 pages.

International Search report for PCT International Application No. PCT/US2018/018642 dated May 23, 2018, 5 pages.

* cited by examiner

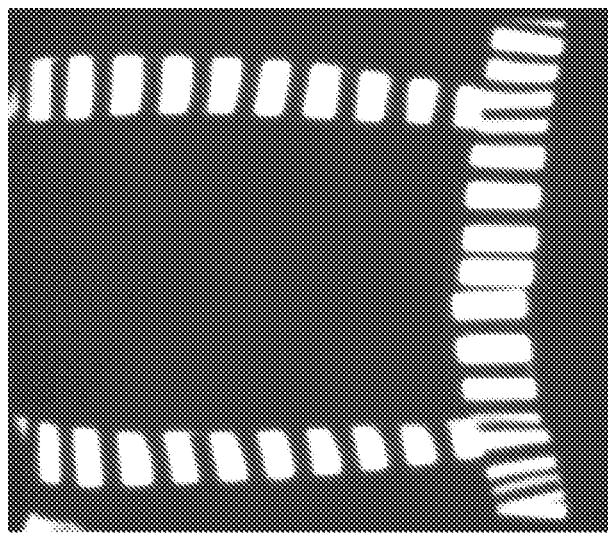
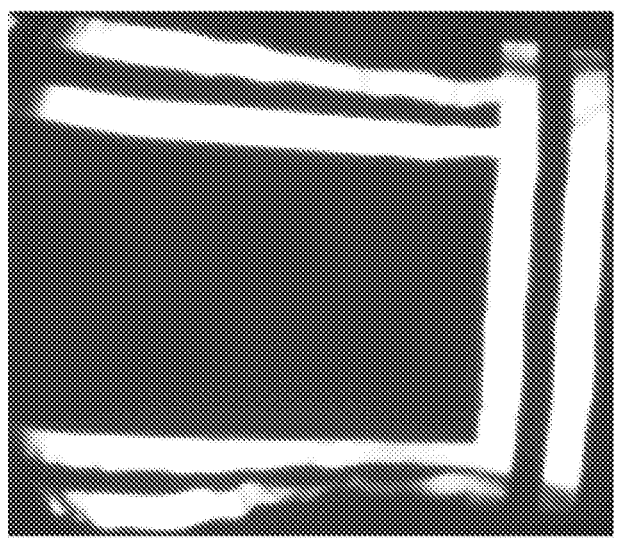
FIG. 6C
FIG. 6B
FIG. 6A

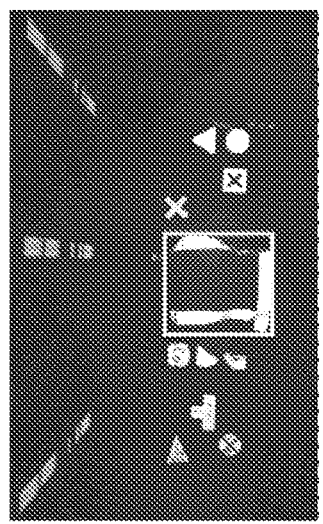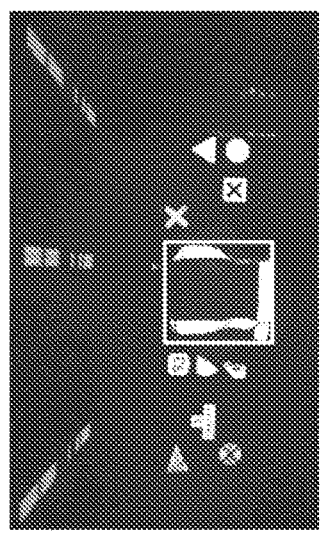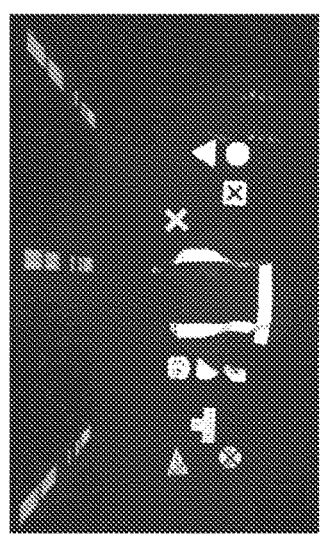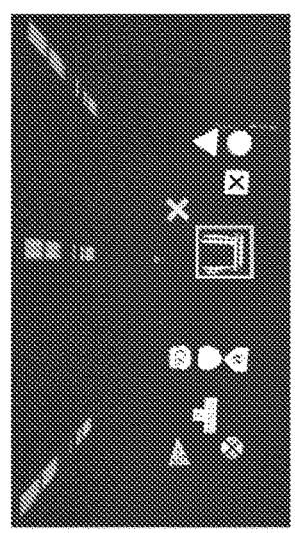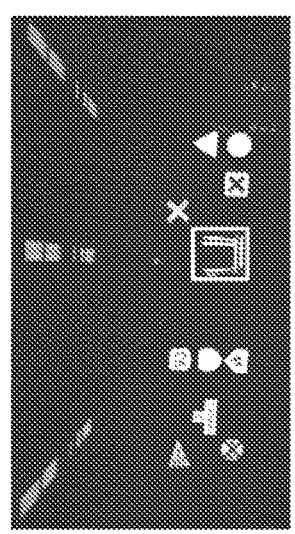
FIG. 8A
FIG. 8B

OPTICAL ARTICLES AND SYSTEMS INTERACTING WITH THE SAME

CROSS REFERENCE TO RELATED APPLICATIONS

This application is a national stage filing under 35 U.S.C. 371 of PCT/US2017/053632, filed Sep. 27, 2017, which claims the benefit of U.S. Application No. 62/461,041 filed Feb. 20, 2017, and No. 62/536,654, filed Jul. 25, 2017, the disclosures of which are incorporated by reference in their entirety herein.

TECHNICAL FIELD

The present disclosure relates to optical articles. More specifically, the present disclosure relates to optical articles that are configured to be readable by optical systems. One exemplary application for such optical articles is when the optical article is disposed on a substrate, such as, for example, infrastructure, wearables, and vehicles, where such optical article is readable by an optical system.

BACKGROUND

Even in view of existing technology related to optical articles, there remains opportunity for improved optical articles and substrates, such as infrastructure, wearables, vehicles, and other articles, containing such optical articles. There is also a need for improved systems for interacting with such optical articles.

Optical articles, such as retroreflective articles, redirect light incident on the article back toward its source. This property led to many practical applications of retroreflective articles in the areas of traffic and personal safety. Retroreflective articles are currently used for traffic signs, car license plates, pavement markings, construction zone cones and barrels, and high visibility trim on clothing worn by workers.

Visual tags offer a solution to limitations of other types of optical tags. However, visual tags require a large power of computation due to the image processing needs in order to differentiate the tag from surrounding background images.

There is a need for a simplified optically active identification method that does not require printing of information on optical articles, such as retroreflective articles.

Systems that interact with optical articles include computer vision systems, or optical systems. These type of systems include methods for acquiring, analyzing, and understanding images. Applications of these systems include robotics, face recognition, image search, machine vision, remote sensing, surveillance, autonomous vehicles, and object detection to name a few. Some examples of applications of object detection include vehicle vision systems, autonomous vehicles, as well as worker safety.

In recent years, computer vision systems have taken numerous approaches to detecting object of interest like pedestrians. Most approaches to object detection include visible, near infrared, or thermal infrared cameras. The problem of object detection is complicated due to the complexity and variety of the environments in which the optical articles and systems can be located in (e.g., daytime or nighttime; urban or city; construction, etc.), the variety of the poses that they can take, and the variety of their appearance based on size, clothing, etc., as well as due to potential partial occlusion.

Many of the pedestrian detection approaches employ exhaustive scanning over the entire image, or template based silhouette matching, body part matching. However, due to variety in the forms that humans can take in images, these approaches are very difficult, time consuming, and have less than ideal performance.

Similarly, the difficult task of detecting and identifying pedestrians at night by human observers led to introduction and regulation of high visibility garments. High visibility garments (i.e., garments with retro-reflective materials) are designed to make the wearer more visible or conspicuous by returning more of the incident light back to the light source and in patterns that can be readily recognized by human viewers as other human forms. Current optical systems are based on collecting a large amount of training data, having human experts annotate it and then training a model to detect the specific object of interest. This collection and annotation of data is time consuming and cost prohibitive.

There is a need for a system that can detect optical articles used on various substrates worn by humans, even when such optical articles are deformed or partially occluded.

SUMMARY

The present disclosure provides a number of advantages over existing optical articles and systems used therewith. The present disclosure provides uniquely patterned, data rich optical articles that can readily convey information to a system, such as an optical system, to allow identification and tracking of users wearing such optical articles.

The present disclosure provides an optical article comprising a data rich plurality of retroreflective elements that are configured in a spatially defined arrangement, wherein the plurality of retroreflective elements comprise retroreflective elements having at least two different retroreflective properties, wherein data rich means information that is readily machine interpretable. In some instances, the data rich plurality of retroreflective elements are configured in a repeating spatially defined arrangement such that the information is interpretable even when the portion of the retroreflective elements are occluded. In some instances, the optical article is a deformable optical article. In some instances, the deformation is at least one of a shrinkage or an expansion.

In some instances, the deformation causes a spacing change between at least two of the retroreflective elements. In some instances, the deformation is reversible.

In some instances, the at least two different retroreflective properties are at least two different retroreflective intensity values. In some instances, the at least two different retroreflective properties are at least two different wavelengths. In some instances, the at least two different retroreflective properties have at least two different polarization states. In some instances, the at least two different retroreflective properties at least two different phase retardations.

In some instances, the aforementioned retroreflective property changes in response to a change in condition. In some instances, the change in condition is at least one of a change in thermal, moisture, mechanical deformation, or radiation.

In some instances, the retroreflective elements are individually sized and separated from one another such that each individual retroreflective element is resolvable at desired distances from the optical article.

In some instances, the spatially defined arrangement comprises geometric arrangement in which the retroreflective elements are positioned with a distance from their neighboring retroreflective elements, and wherein the retroreflective elements have a periodicity from one element to another within the spatially defined arrangement. In some instances, the periodicity is a regular periodicity. In some instances, the periodicity is an irregular periodicity. In some instances, the spatially defined arrangement is rotationally insensitive.

In some instances, a number of geometric arrangements are required per spatially defined arrangement depends on a required quality of fit. In some instances, the retroreflective elements are positioned from their nearest neighboring retroreflective elements by a characteristic distance. In some instances, the retroreflective elements have a characteristic ratio of size to distance to neighboring retroreflective elements that is invariant with viewing angle.

In some instances, the optical article further comprises a printed layer disposed on the outer surface of at least a portion of the retroreflective elements. In some instances, the retroreflective properties are detectable in the infrared spectrum with a computer vision system. In some instances, the optical article is disposed on a substrate selected from at least one of infrastructure, wearables, and vehicles.

The present disclosure provides a fabric comprising the aforementioned articles. The present disclosure also includes a system comprising any of the aforementioned articles, an optical system, and an inference engine for interpreting and classifying the plurality of retroreflective elements wherein the optical system feeds data to the inference engine. In some instances, the article is disposed on at least one of infrastructure, targets, wearables, and vehicles.

In some instances, the optical system is part of a vehicle, and further wherein the vehicle uses the information as an input to an autonomous driving module. In some instances, the vehicle uses the information to provide human language feedback to the driver. In some instances, the vehicle uses the information to provide at least one of haptic, audible or visual feedback to the driver.

In some instances, the data rich plurality of retroreflective elements is visible in the infrared spectrum with a computer vision system. In some instances, the information related to the data rich plurality of retroreflective articles comprises at least one of road workers expected, pedestrians expected, construction workers expected, students expected, emergency responder workers expected.

In some instances, the inference engine is locally stored as a component of the optical system. In some instances, the optical system communicates with the inference engine using a wireless communication protocol. In some instances the inference engine includes a look up table with assigned meanings associated with specific patterns of data rich plurality of retroreflective elements. In some instances, the inference engine includes a look up table.

The above summary is not intended to describe each embodiment of the present disclosure. The details of one or more embodiments of the present disclosure are also set forth in the description below. Other features, objects, and advantages of the present disclosure will be apparent from the description and from the claims.

BRIEF DESCRIPTION OF DRAWINGS

The invention may be more completely understood in consideration of the following detailed description of various embodiments of the invention in connection with the accompanying drawings, in which:

FIG. 6 depicts an exemplary modifications to a carrier pattern. The carrier pattern is shown in (a). A modification to the pattern can include a gap introduced into the middle of the strips as shown in (b) or repeating gaps in the form of a segmented trim like that shown in (c).

FIGS. 8a and 8b depict an exemplary system for image processing useful in some embodiments in the presently disclosed system.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The term "data rich" as used herein means information that is readily machine interpretable.

The term "highly salient" as used herein means something that stands out from other entities or features in an environment.

The term "object part detector" as used herein means a detector that can find individual parts of an object in image/video instead of finding the whole object itself.

The term "over glow" as used herein means the amount and position of detected retroreflective intensity in a retroreflective image outside of the actual boundaries of the retroreflective elements being viewed in the retroreflective image.

The present disclosure provides an optical article comprising a data rich plurality of retroreflective elements that are configured in a spatially defined arrangement. The plurality of retroreflective elements includes retroreflective elements, where these plurality of retroreflective elements have at least two different retroreflective properties.

In some instances, the at least two different retroreflective properties are at least two different retroreflective intensity values. In some instances, the at least two different retroreflective properties are at least two different wavelengths. In some instances, the at least two different retroreflective properties have at least two different polarization states. In some instances, the at least two different retroreflective properties at least two different phase retardations.

In some embodiments, the data rich plurality of retroreflective elements are configured in a repeating spatially defined arrangement such that the information is interpretable even when the portion of the retroreflective elements are occluded.

Figure 1A:
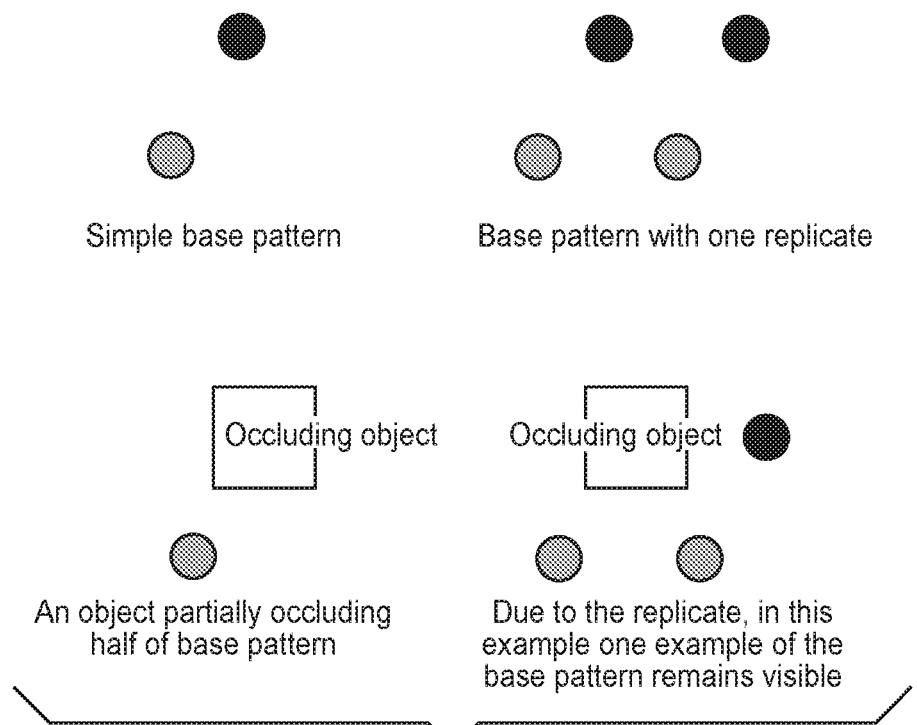
FIGS. 1a to 1m show various patterns of retroreflective elements included in the presently disclosed optical articles.
Figure 1B:
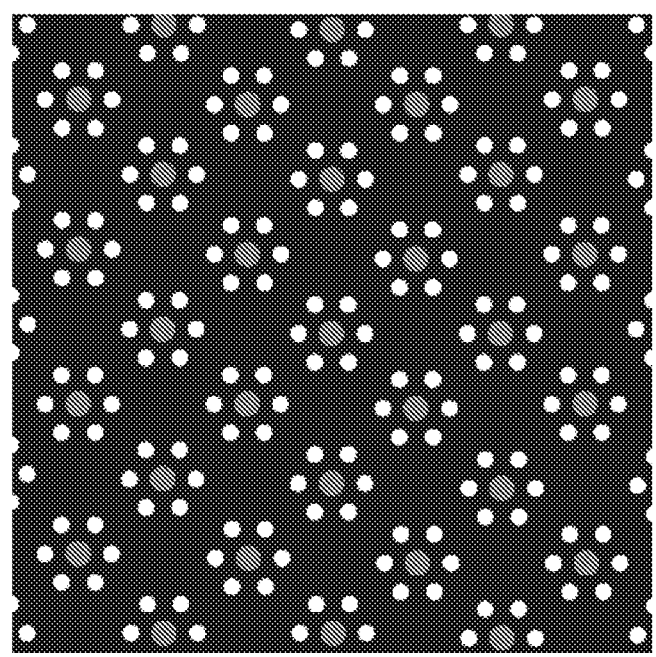
Figure 1C:
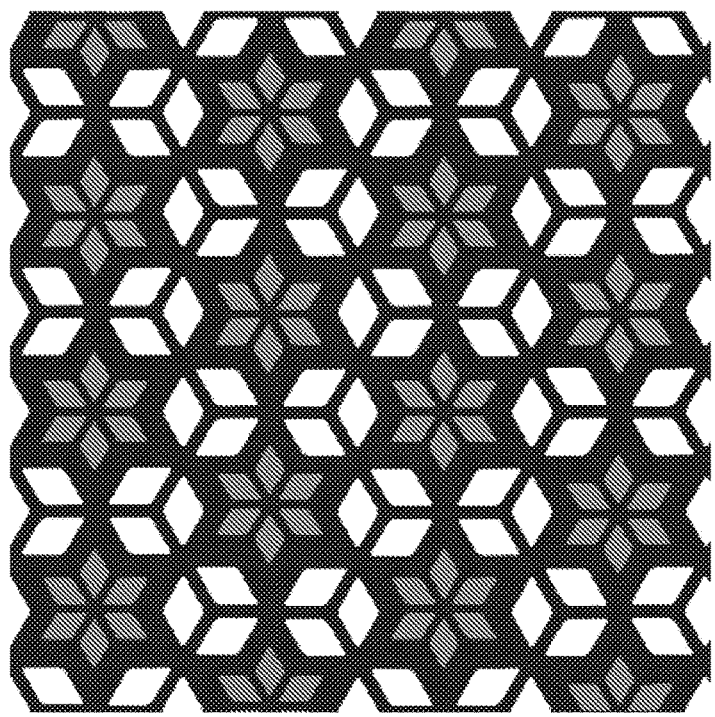
Figure 1D:
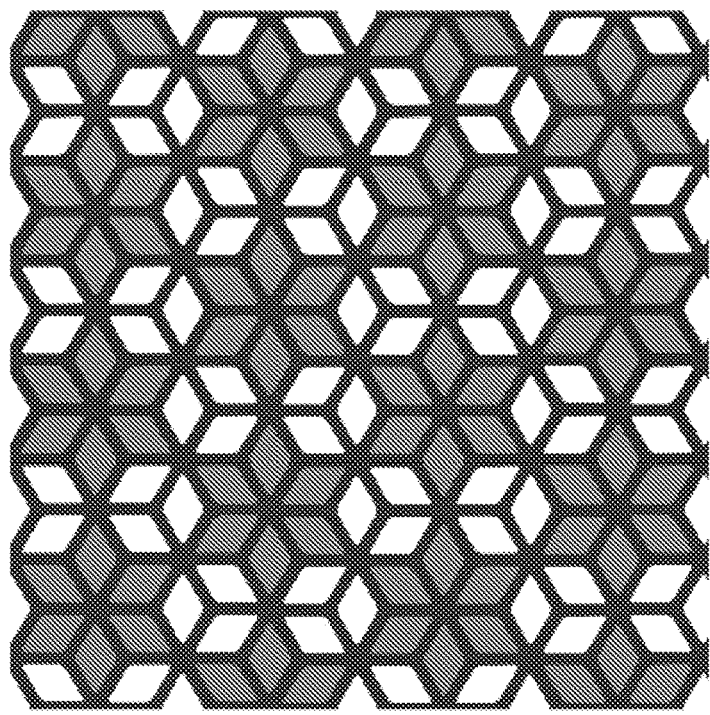
Figure 1E:
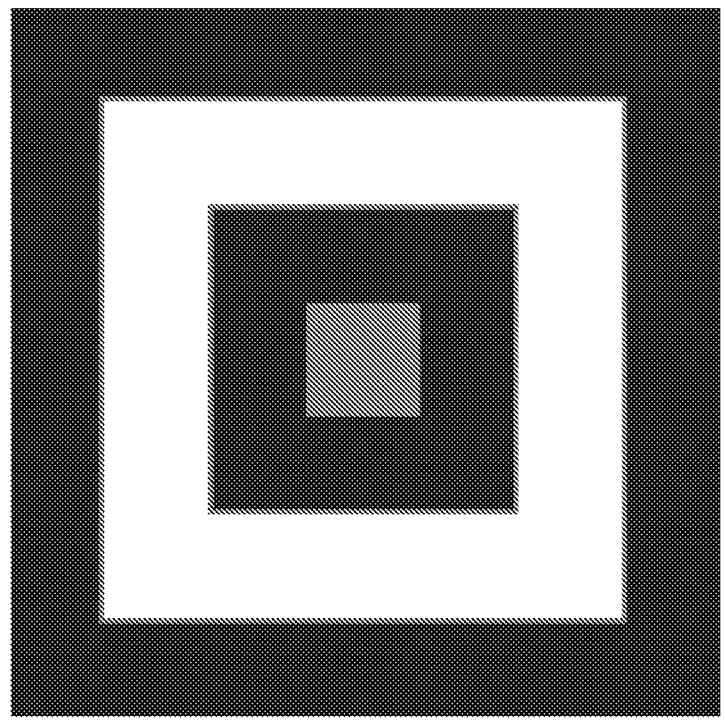
Figure 1F:
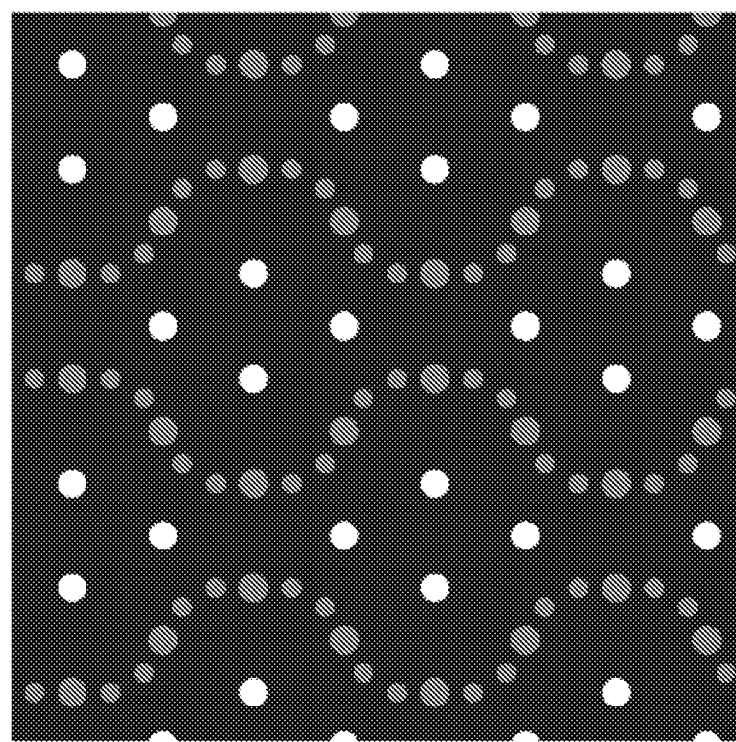
Figure 1G:
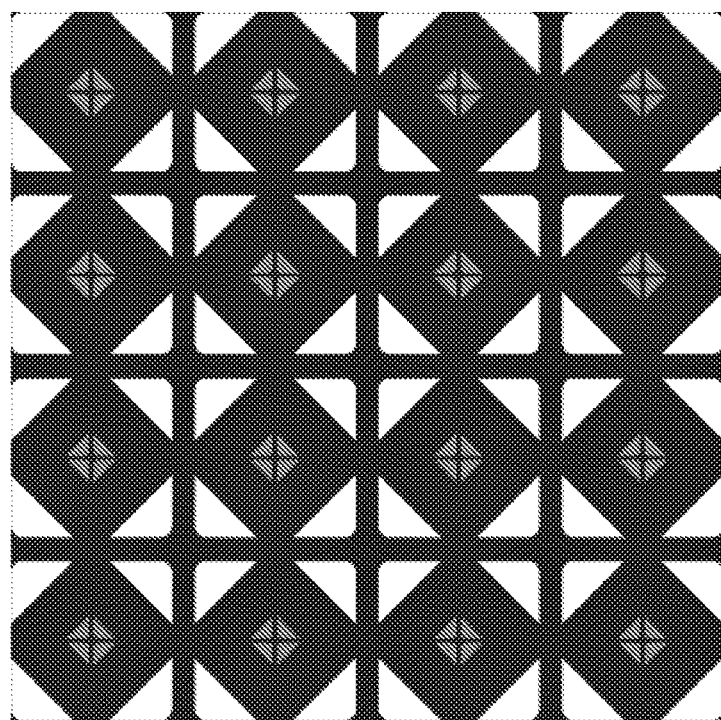
Figure 1H:
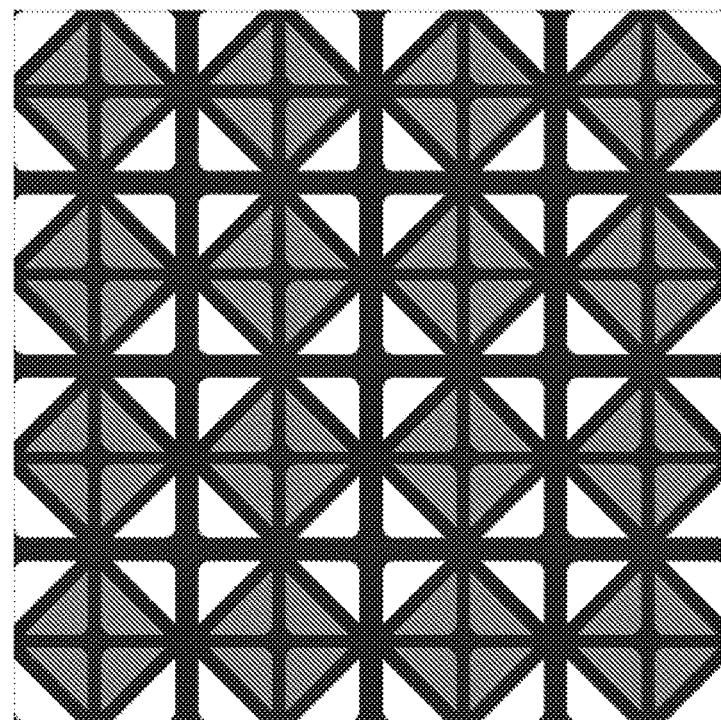
Figure 1I:
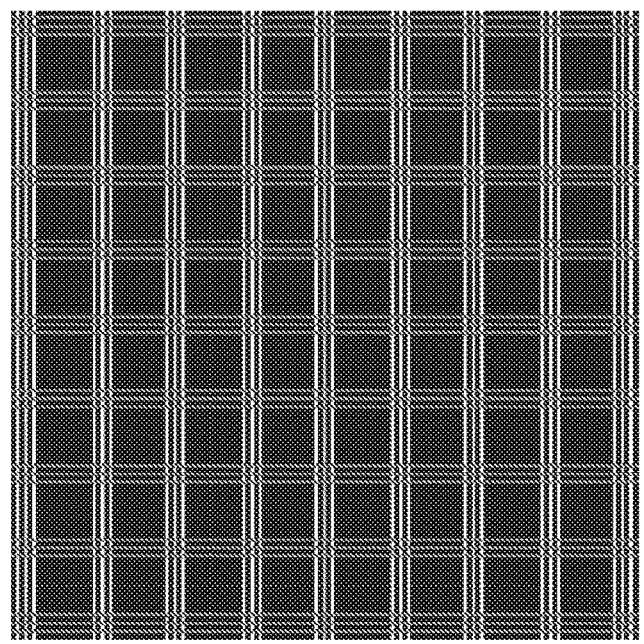
Figure 1J:
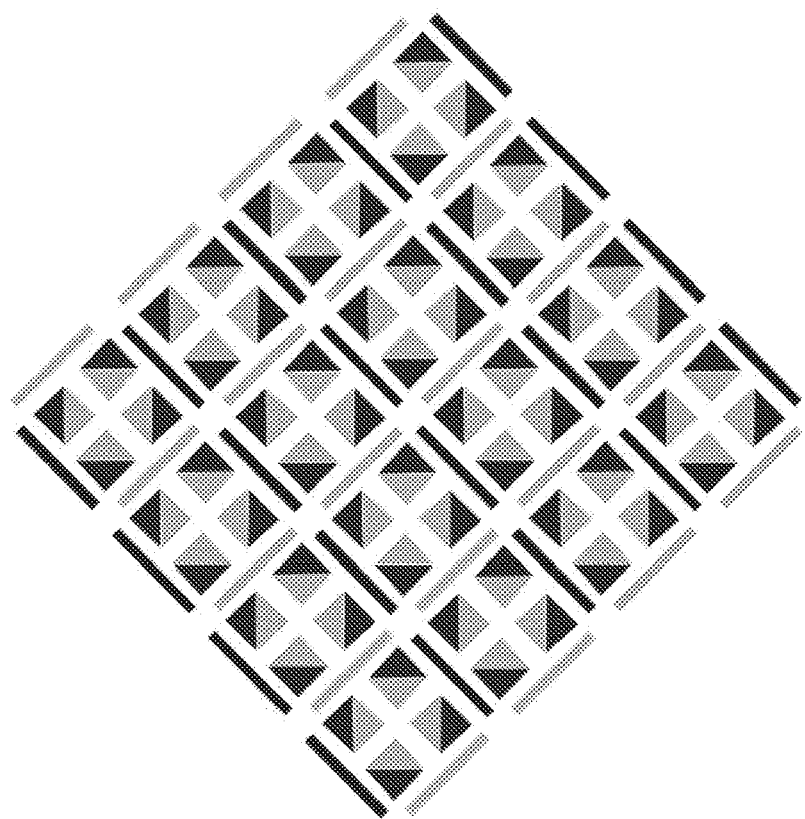
Figure 1K:
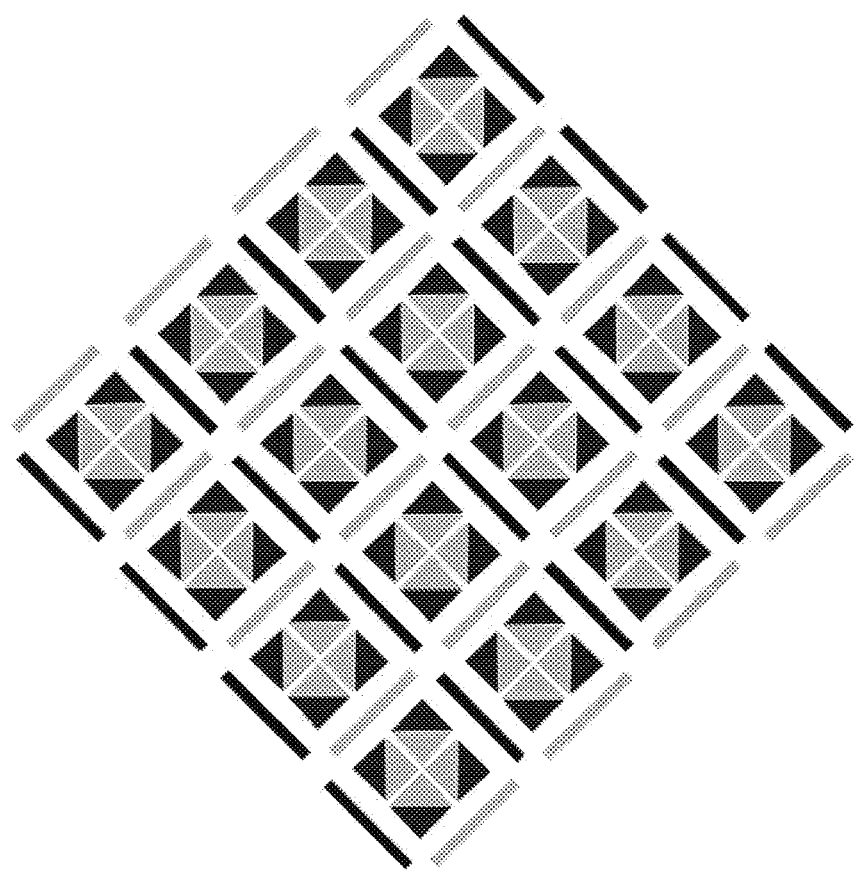
Figure 1L:
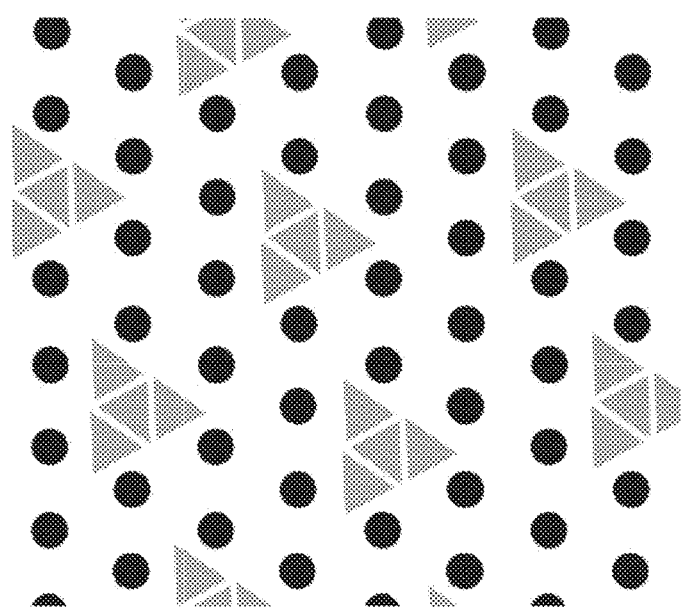
Figure 1M:
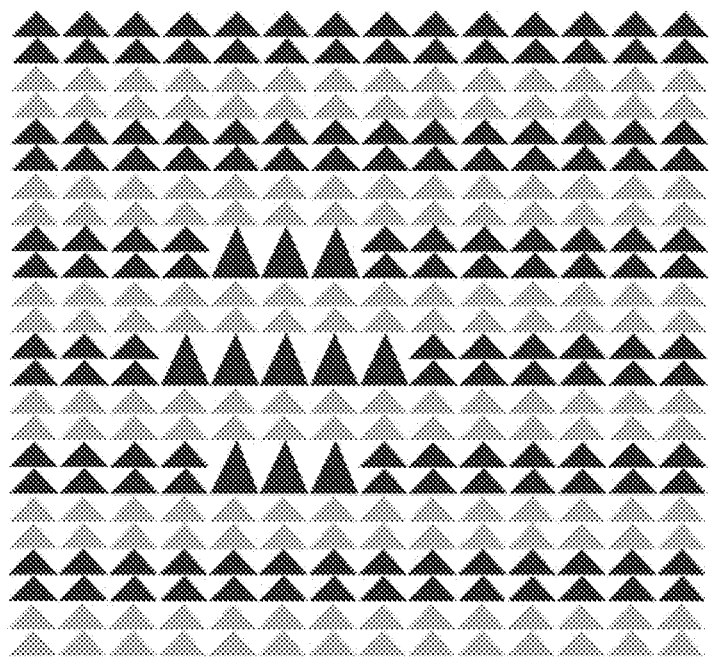

FIG. 1a illustrates the effect of occlusion and pattern replication. The upper-left quadrant shows a sample base pattern of retroreflective elements. In this example, imaging that the patterns is identifiable if both of the circles are visible; the upper-right quadrant shows the same base pattern with one replication; in the lower-left quadrant of FIG. 1a a white object has occluded one of the elements in the pattern. In this case, the occlusion results in an inability to detect the pattern. In the lower-right quadrant once again a white object is occluding one of the elements of the pattern but due to the replication there are still sufficient elements for detection of pattern of the optical article by a system, such a visions detection system. Various patterns of retroreflective elements can be used in the present disclosure, such as the exemplary designs shown in FIGS. 1b to 1m.

If the classifier in a system, such a vision detection system, is based on checking the number of retroreflective elements in the pattern against a minimum required number of retroreflective elements, a pattern containing at least one more element than the specified minimum will be detectable under partial occlusion. In comparison, a classifier in a system, such a vision detection system, looking for a specific number of retroreflective elements is not robust when at least one of the retroreflective elements in the pattern is occluded.

The present disclosure also provides that the plurality of retroreflective elements can have the same or different shapes. Useful shapes for individual retroreflective elements includes, but are not limited to, circles, stars, squares, polygons, curved and irregular shapes, and the like. These individual retroreflective elements can be arranged in a mathematical way of arranging shapes such that the arrangement can be detected independent of the individual component shapes, optionally the individual component shapes could add additional information. Mathematical arrangement refers to a scheme for sizing and spacing apart the components of the resulting optical article.

These retroreflective elements or resulting optical articles may be either standalone or may be repeating to increase robustness to partial occlusion. If the elements or articles are small, repetition may be required for robust detection, if the optical article is large it is likely to be robust to partial occlusion due to a subset being visible.

Optionally any number of the component shapes could be engineered to selectively reflect light of different wavelengths and/or polarization. For example, in some embodiments, retroreflective elements with properties sufficient to meet regulatory standards (e.g., ANSI compliant material) but a subset of the optical article is constructed such that it has special optical properties (e.g., wavelengths and/or polarization reflected) such that a system (such as a computer vision system) can discriminate between these sections of the optical article and the rest of the optical article or objects on which it is mounted. One example of the utility of such a construction might be, if to be regulatory compliant gaps in the retroreflective elements had to be less than X mm, but computer vision system detection necessitated gaps greater than X mm. These two requirements would be in conflict unless the construction of the retroreflective elements allowed the computer vision system to only see a subset of the retroreflective elements but the entire (or at least a portion of the optical article or retroreflective elements) is sufficient to meet standards because the resulting optical article is reflective to light in a spectrum that is detectable by humans.

In some embodiments, the number of unique retroreflective elements in the optical article, should be robust to deformation and perspective changes up to the point where retroreflective elements become completely occluded or they begin to merge together versus density of bright pixels.

The spacing and feature size of the retroreflective elements (or shapes) comprising the optical article will likely need to factor in over-glow. One optional construction of the present disclosure might include retroreflective elements that are constructed of more than one level of reflective material so as to reduce effect of over-glow. For example, the outer edge of the retroreflective elements might be constructed from lower $R_A$ material as compared to the internal portion of the retroreflective elements. In some embodiments, a minimum measured difference in $R_A$, such as at least a difference of 5%, 10%, 20%, 50% or more, is useful.

The retroreflective elements can be manufactured by any number of methods including but not limited to: screen printing, weaving, stitching, and the like. In some embodiments, the optical article is a deformable optical article. In some instances, the deformation is caused by shrinkage, expansion, or both. In some instances, the deformation causes a spacing change between at least two of the retroreflective elements. In some instances, the deformation is reversible.

In some instances, the aforementioned retroreflective property changes in response to a change in condition. For example, a change in condition that could cause a change in at least one of the retroreflective properties of the plurality of retroreflective elements could be a change in thermal, moisture, mechanical deformation, or radiation. Thermal changes could be changes in ambient temperature, for example. Exemplary moisture changes include changes in ambient humidity or the presence of precipitation in an environment in which the optical article is being used. Mechanical deformation could include, for example, wrinkling of a garment on which the optical article is mounted.

In some instances, the retroreflective elements are individually sized and separated from one another such that each individual retroreflective element is resolvable at desired distances from the optical article.

In some instances, the spatially defined arrangement comprises geometric arrangement in which the retroreflective elements are positioned with a distance from their neighboring retroreflective elements, and wherein the retroreflective elements have a periodicity from one element to another within the spatially defined arrangement. In some instances, the periodicity is a regular periodicity. In some instances, the periodicity is an irregular periodicity. In some instances, the spatially defined arrangement is rotationally insensitive.

In some instances, a number of geometric arrangements are required per spatially defined arrangement depends on a required quality of fit. In some instances, the retroreflective elements are positioned from their nearest neighboring retroreflective elements by a characteristic distance. In some instances, the retroreflective elements have a characteristic ratio of size to distance to neighboring retroreflective elements that is invariant with viewing angle.

In some instances, the optical article further comprises a printed layer disposed on the outer surface of at least a portion of the retroreflective elements. In some instances, the retroreflective properties are detectable in the infrared spectrum. In some instances, the optical article is disposed on a substrate selected from at least one of infrastructure, wearables, and vehicles.

The present disclosure provides a fabric comprising the aforementioned articles. The present disclosure also includes a system comprising any of the aforementioned articles, an optical system, and an inference engine for interpreting and classifying the plurality of retroreflective elements wherein the optical system feeds data to the inference engine. In some instances, the article is disposed on at least one of infrastructure, targets, wearables, and vehicles.

In some instances, the optical system is part of a vehicle, and further wherein the vehicle uses the information as an input to an autonomous driving module. In some instances, the vehicle uses the information to provide human language feedback to the driver. In some instances, the vehicle uses the information to provide at least one of haptic, audible or visual feedback to the driver.

In some instances, the data rich plurality of retroreflective elements is visible in the infrared spectrum to a computer vision system. In some instances, the information related to the data rich plurality of retroreflective articles comprises at least one of road workers expected, pedestrians expected, construction workers expected, students expected, emergency responder workers expected.

In some instances, the inference engine is locally stored as a component of the optical system. In some instances, the optical system communicates with the inference engine using a wireless communication protocol. In some embodiments, the inference engine and the optical system can include various features and steps as disclosed in the following section on methods and systems useful in the present disclosure.

The presently disclosed system is useful for various applications. For example, the presently disclosed system utilizes the presently disclosed optical article for the purpose of simplifying and enhancing detection capabilities of a system, such as a computer vision pedestrian detection, which allows for the system to determine location, identification, and/or pose of an individual wearing a garment, accessory or other objects on which the optical article is disposed. The data rich content in the plurality of retroreflective elements aids in simplification of the task of pedestrian detection by reducing the number of distractors that the optical system needs to evaluate by first thresholding the image based on properties of the optical (such as, for example, intensity and/or color spectrum of the light returned) and then evaluating those segmented regions for meaningful shapes (or patterns) based on the design of the garment, accessory or other article on which the optical article is disposed and likely poses of the wearer.

Figure 2A:
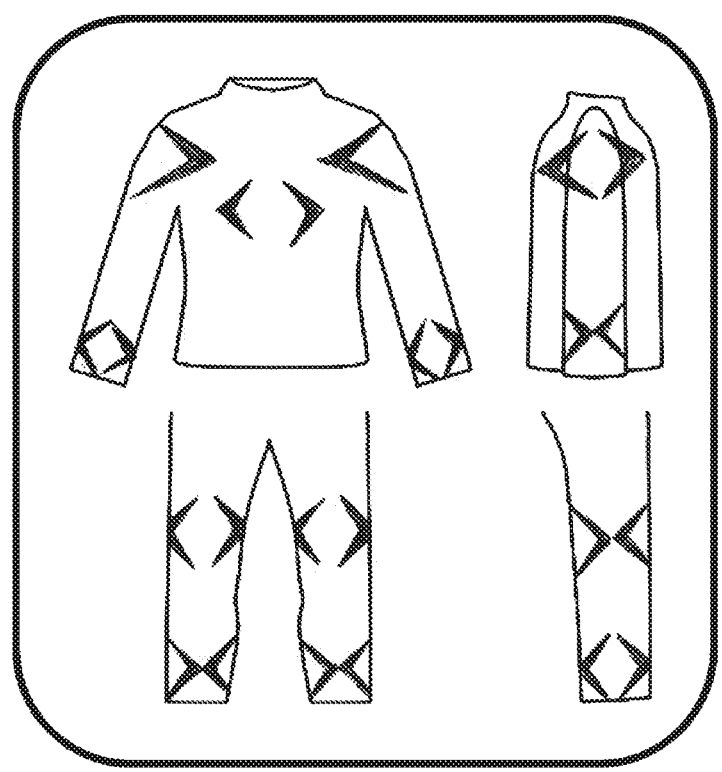
FIGS. 2a and 2b show the presently disclosed optical articles disposed on an objects.
Figure 2B:

The presently disclosed system includes at least one camera, a light source (such as, for example, vehicle headlights, or other visible, NIR, or FIR light sources), and the presently disclosed optical articles. The presently disclosed system utilizes the pattern of light returned from the optical article to identify the object on which the optical article is disposed, infer pose, position, likelihood of intersection, etc. One possible embodiment might utilize a garment design, such as those illustrated in FIGS. 2a and 2b. In this example, a frontal view of the garment has a different number and pattern of visible optical articles having a plurality of retroreflective elements than a profile view of the garment. If the optical articles on the garment are of a known size (for example, if the chevrons in this case are all 6 inches in length) then the system could infer relative distance and position of the wearer from the camera based on projected size and position.

Figure 3:
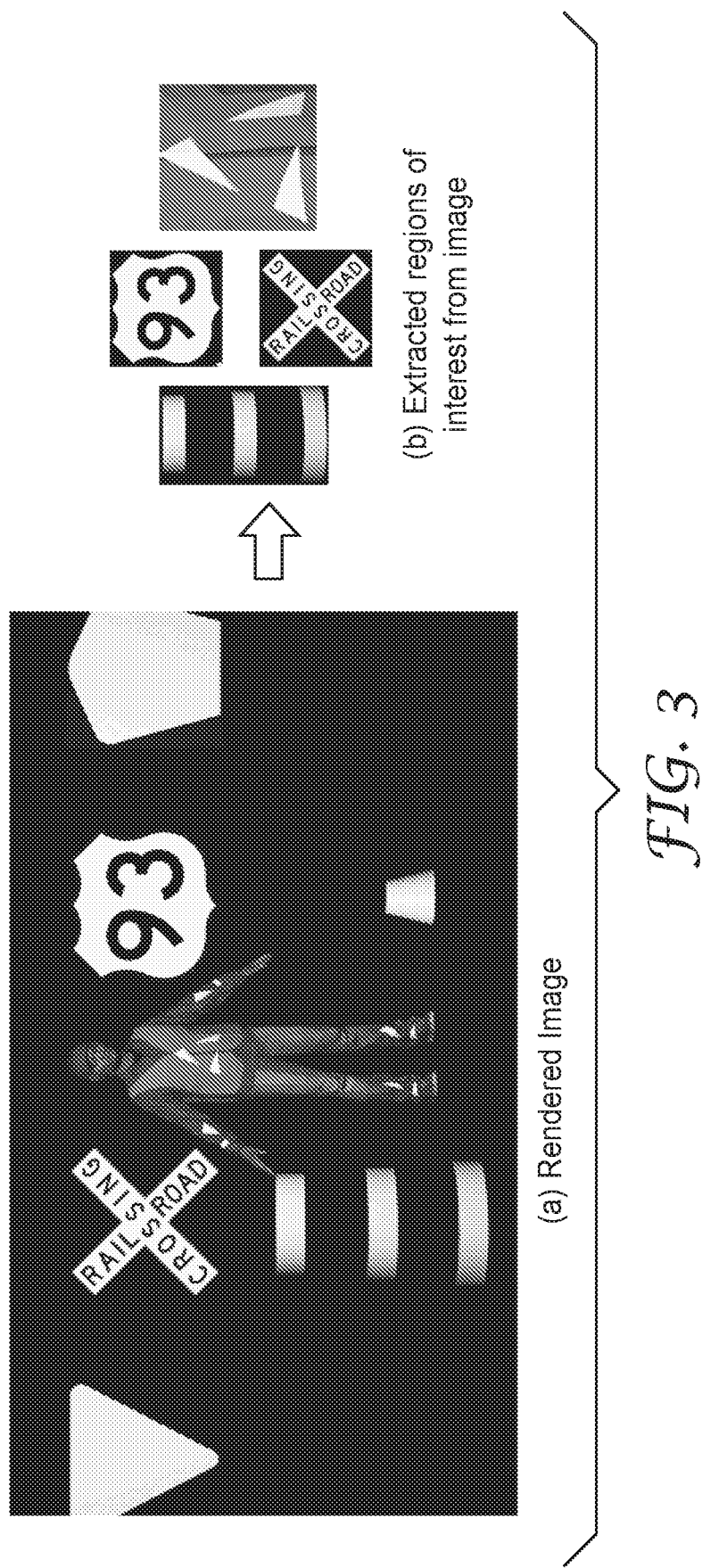
FIG. 3 shows a rendered image of an environment including the shape in presence of distractors produced by a software and an automatic extraction of the regions of interest (ROI) for the shapes from the synthetically generated image according to some embodiments of the presently disclosed system.

The present disclosure includes a system and method for automatically evaluating the saliency of design shapes, such as optical articles and a plurality of retroreflective elements included therein, for an application environment without having to collect real world data (images/videos) of such shapes. The sequence of steps to perform this methodology is depicted in FIG. 3 and described here:

The input to the system is the shape of interest, such as optical articles and a plurality of retroreflective elements included therein. For the application environment, a set of distractor shapes (or objects) which commonly occur in the environment is known e.g. for a highway application, the distractor set can include highway information sign, speed limit sign, cones, barrels, and the like.

The design shape (such as optical articles and a plurality of retroreflective elements included therein) placed on an object of interest (such as infrastructure, garments, accessories, and the like) and distractor set is input into an algorithm or software for generating a synthetic dataset of images and videos. This includes, but is not limited to, a render software which uses a 3D model of the environment to produce a rendering of the object in that environment. This will generate data which can simulate effects like lighting effects, viewpoint variations, environment clutter, object motion, and the like. FIG. 3(a) shows a sample rendered image of a highway worker wearing a high visibility garment with an exemplary optical article of the present disclosure as the design shape in the frontal portion of his garment.

The regions of interest (ROI) corresponding to the design shape (e.g., optical articles and a plurality of retroreflective elements included therein) and the distractor are extracted from the images. FIG. 3(b) shows one such example of ROIs extracted from a rendered image. This process can be automated using knowledge about the 3D model provided for the rendering of the environment.

For each extracted ROI, features characterizing their properties like appearance, shape, texture, geometry are computed e.g. shape context, histogram of oriented gradients, area, etc.

Figure 4:
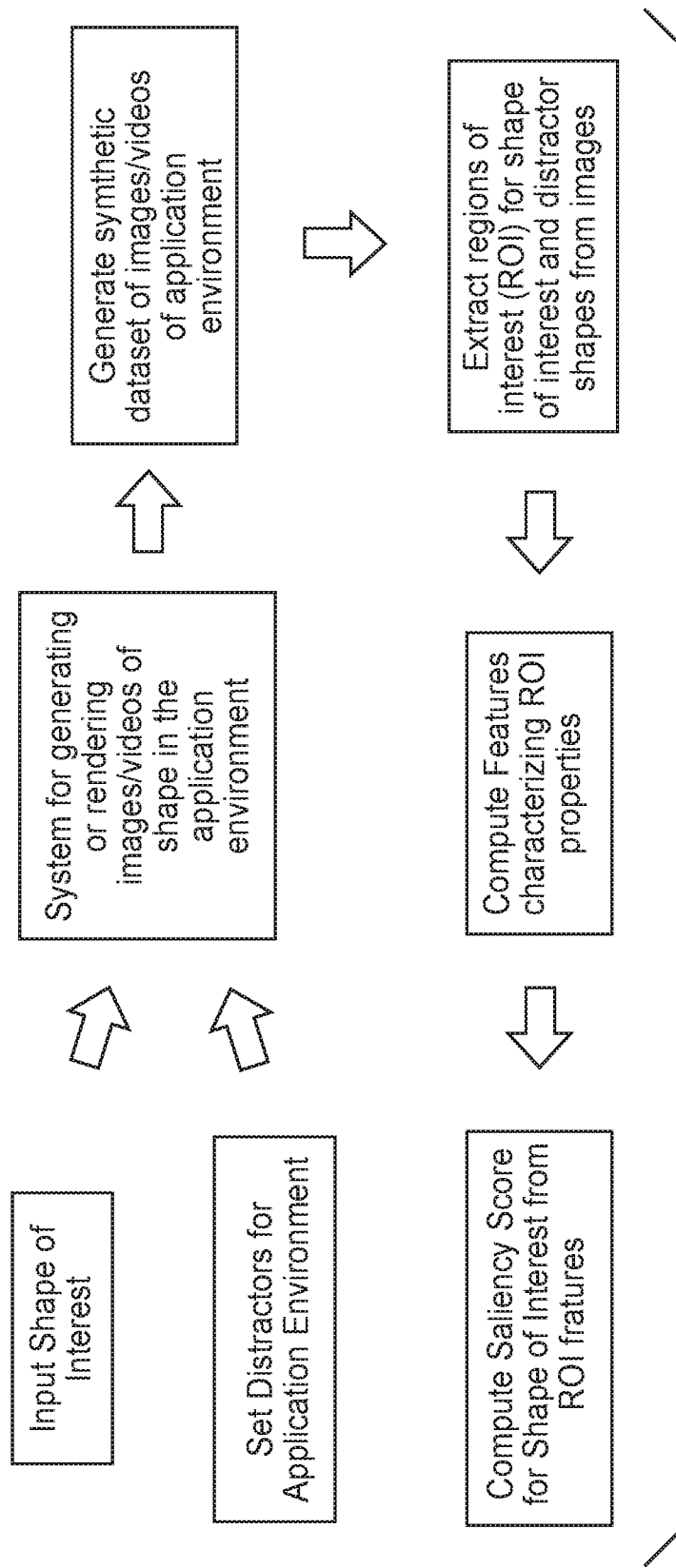
FIG. 4 depicts a flowchart describing the steps for evaluating the saliency of an input shape using synthetically generated data according to some embodiments of the presently disclosed system.

The computed features are then input into an algorithm, an example of which is shown in FIG. 4, that can generate the saliency score for the design shape (e.g., optical articles and a plurality of retroreflective elements included therein) against the set of distractor shapes. The saliency evaluation generates a quantitative score for the design shape's uniqueness amongst the set of distractors.

Figure 5:
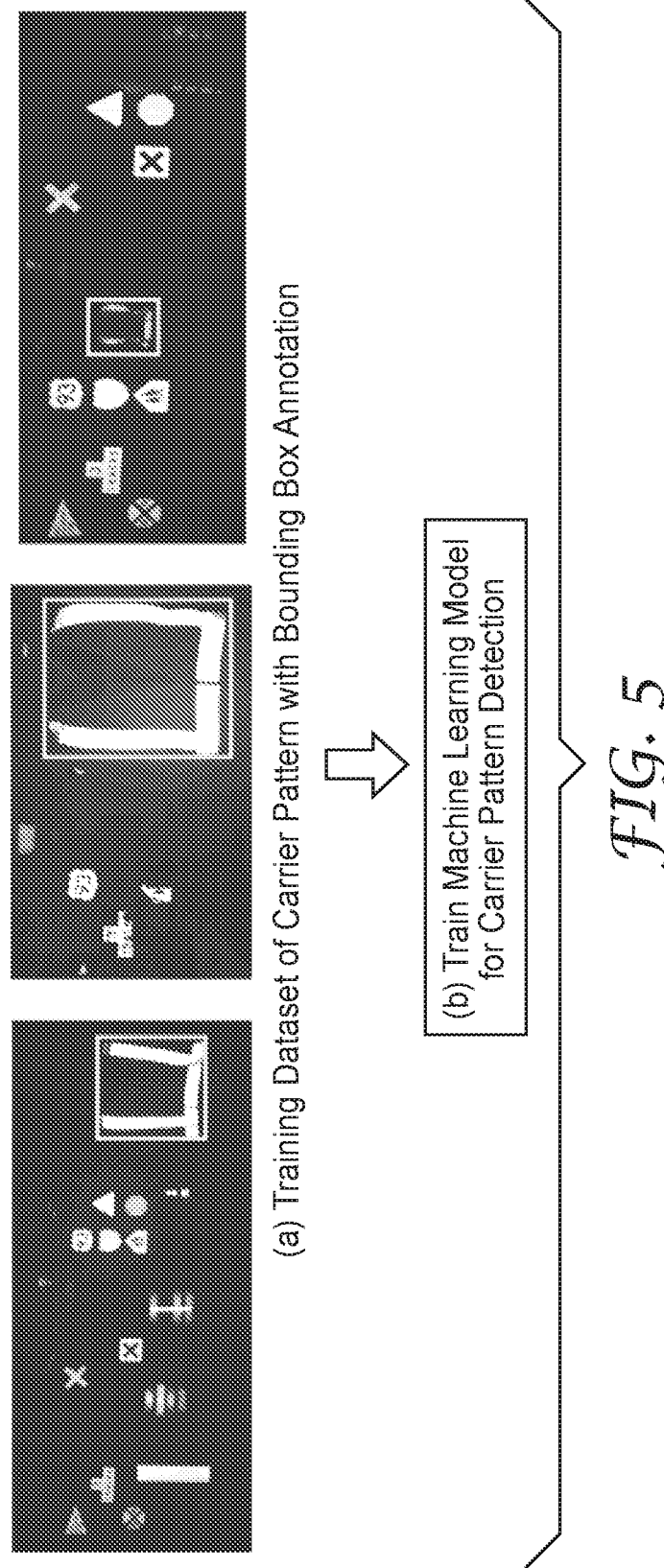
FIG. 5 depicts an image of the object of interest (carrier pattern). The images are annotated with a bounding box located around the object as shown in (a). A machine learning model is trained to disambiguate between this carrier pattern and other objects found in the environment in (b).

The present disclosure also provides a system and method that modifies retroreflective shapes (such as optical articles and a plurality of retroreflective elements included therein) on objects of interest (such as infrastructure, garments, accessories, and the like) to provide additional information. In this invention, the object of interest is also referred to as a carrier pattern. Exemplary objects of interest, or carrier patterns, include a high-visibility safety vest worn by workers in work-zones, barrels used in roadside construction zones to mark navigation limits, and other infrastructure, garments, accessories, and the like. The sequence of steps to perform this methodology is described here:

Annotated images of the carrier pattern are collected for the environment. These include the images of objects from varying distances, poses and viewpoints. As an example, FIG. 5 includes examples of retroreflective vests worn by individual workers in work-zones.

A machine learning model is trained to classify image patches as the carrier pattern or not. To train this model, image patches of the carrier pattern and the background (image patches which do not include the carrier pattern) are provided. Image features characterizing the appearance of these image patches like a histogram of oriented gradients (HOG) or shape context are computed. These features are then used to train a classifier model e.g. Support Vector Machine (SVM) or Decision Trees. The input to this model is the computed feature for an image patch and the output can be (but not limited to) yes/no answer for presence of the carrier pattern in the input image patch.

Given a carrier pattern and based on the requirements of the system for the environment, modifications are made to the retroreflective shape of the carrier pattern. An example is provided in FIG. 6 where the H-shape used in safety vests is partially modified to produce 2 additional sub-categories of the pattern. The modifications are not just limited to size and could include changes to the color of the pattern also.

Figure 7:
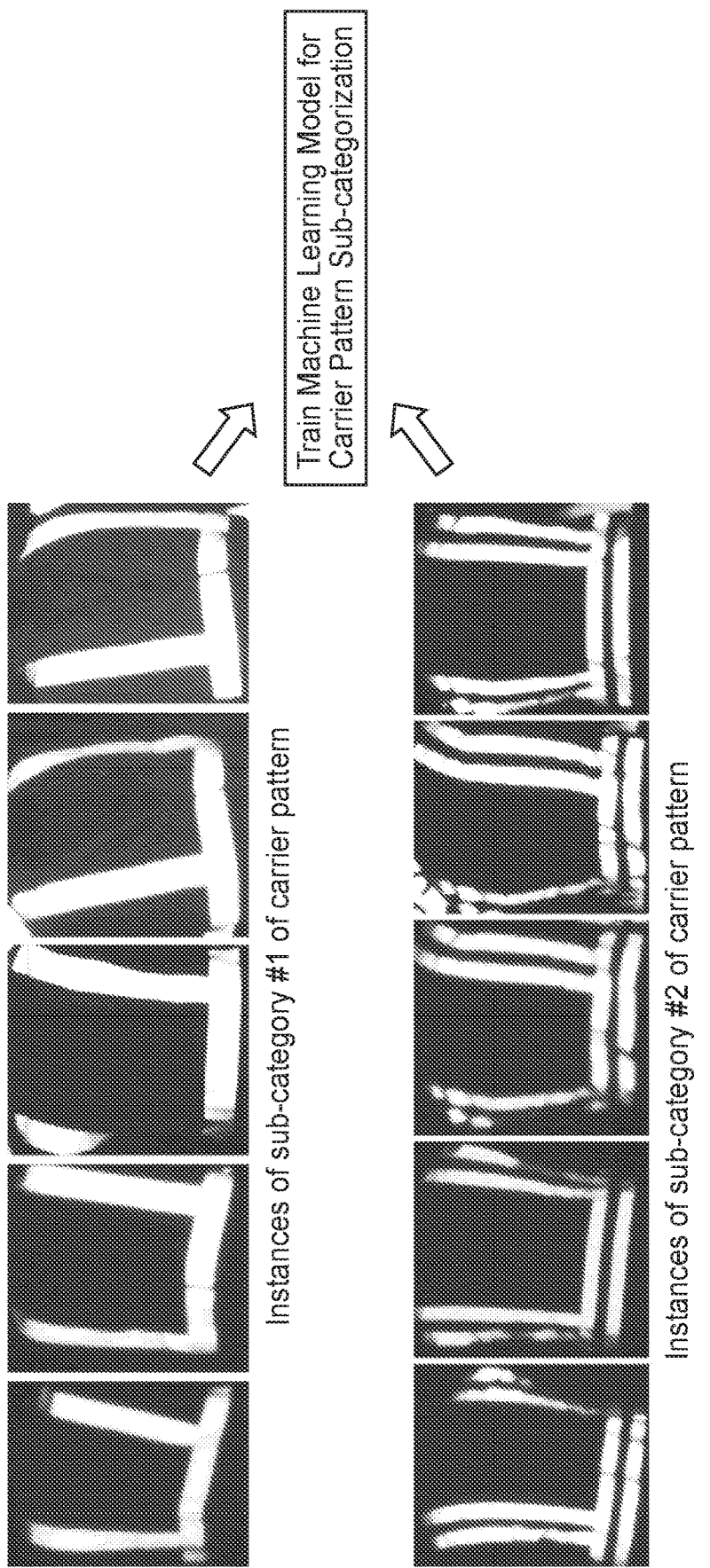
FIG. 7 depicts images of instances of different subcategories of the carrier pattern.

Images of the different sub-categories are collected in a data collection experiment or through a synthetic data generation module. Besides collecting images of the different sub-categories individually, it is also possible that the carrier pattern image already include instances of the sub-category and a clustering algorithm can be used to discover these instances A sub-categorization classifier is trained using instances of the different sub-categories as shown in FIG. 7.

At runtime, the system first looks for the presence of the carrier pattern. Having detected the carrier pattern in an image patch, that image patch is then processed by the sub-categorization module for the sub-category present in the image. Example are provided in FIG. 8a and FIG. 8b.

Figure 9:
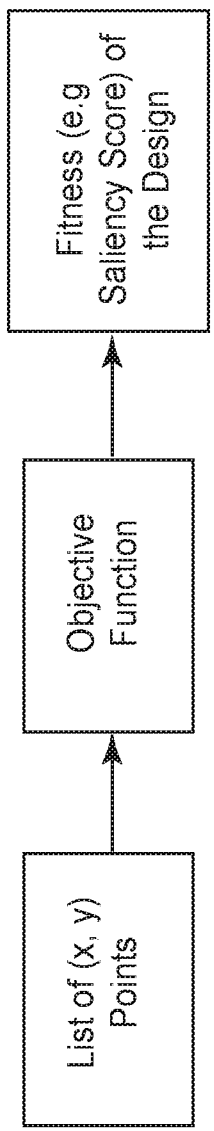
FIG. 9 shows an overview of an evaluation process of possible shape arrangements useful in algorithms that can be used in some embodiments of the presently disclosed system.

In some embodiments, the presently disclosed system also provides two algorithms that are used to 1) initialize the boundary of a shape of an optical article that is placed on an object of interest, such as a garment and 2) define an objective function that measures the usefulness or fit of that boundary configuration. Each of the algorithms searches the space of possible geometries and yields a geometry that optimizes that objective function. FIG. 9 illustrates the process of evaluating each possible geometry (parameterized as a set of [x, y] points). In some embodiments, one of the algorithms is a genetic algorithm and the other algorithm is a numerical gradient-based optimization algorithm. Each of these algorithms uses a different technique to generate sample geometries, evaluate them, and attempt to further generate new arrangements with improved evaluation scores.

Figure 10:
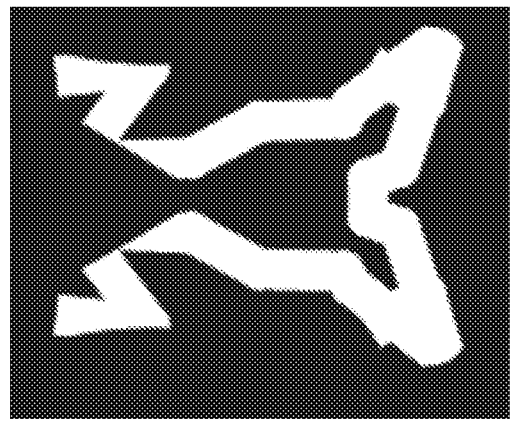
FIG. 10 shows a design with a fit (or saliency) score of 0.752332, produced after 1484 generations of the genetic algorithm useful in some embodiments in the presently disclosed system.
Figure 11:
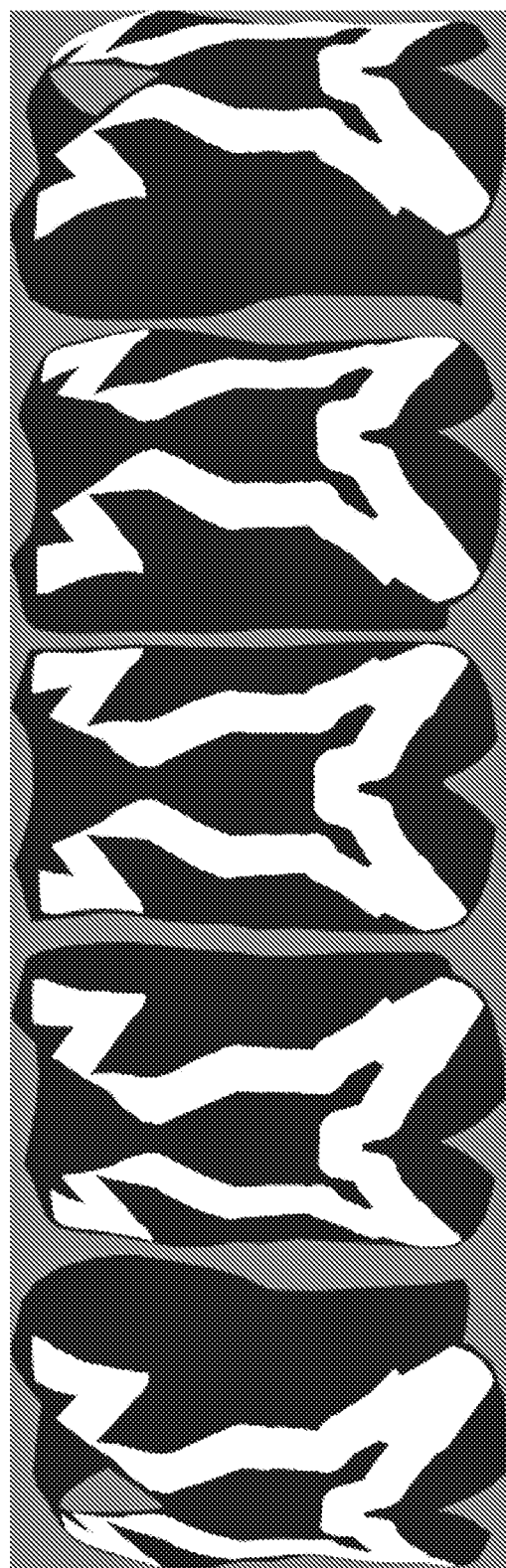
FIG. 11 shows the design from FIG. 10, rendered onto 3D vest model by an algorithm useful in some embodiments in the presently disclosed system.

In some embodiments, the plurality of retroreflective elements are placed in configurations that produce designs, such as garment designs, which are highly salient to a system, such as systems used by motorists (see FIG. 10). The objective function assesses the saliency of a design by applying that design as a texture to a 3D model of a vest (i.e. the kind of vest worn by a construction worker). A 3D Modeling application (i.e. Blender) is used to produce several different views of this 3D model (see FIG. 11). The resulting views are fed into a clustering algorithm, as well as a set of 'distractor' shapes. The distractor shapes depend on an application space. In some embodiments, distractor shapes are objects that can be confused as the object of interest in the presently disclosed systems and methods. The clustering algorithm groups these inputs into clusters.

In some embodiments, clustering accurately sorts each of these designs into one cluster and each of the distractor shapes into the other cluster. This results in a fitness of 1.0. Fit can be quantified by 'Silhouette Score', which measures the quality of a set of clusters, based on known ground truth labels. In other words, Silhouette Score is used to measure how well the clustering algorithm performs. There are other potentially useful methods of quantifying the quality of a set of clusters.

In some embodiments, a SciPy optimization toolkit for Python can be used to produce a design as a part of our proof-of-concept experiment, where an objective function that generated circular shapes is used. The SciPy function is called scipy.optimize.minimize( ). This function is supplied with 1) a list of [x, y] points that define the starting configuration of the boundary of the polygonal shape of the design (such as an optical article using a plurality of retroreflective elements), 2) an objective function that quantifies the cost of a particular configuration of this design, with lower values being better 3) a specification of which optimization method to use for the optimization, and 4) a list of shape or size constraints.

In some embodiments, the Optimization Method is chosen from a list of options in the documentation (e.g. Sequential Least Squares Programming). The Constraints might be defined to constrain any or all of the constraints listed in FIG. 12.

A genetic algorithm is used to optimize a data structure. The data structure is called a chromosome (with an analogy to the container of genetic material in a living system). The genetic algorithm generates multiple chromosomes (either completely randomly or by making random variations on a seed design). The fitness of each chromosome is then determined. The chromosomes with poor fitness are deleted and replaced with copies of the highly fit chromosomes. The new copies are modified using mutation operators. A mutation operator applies stochastic changes to some of the values in the chromosome. The copies may be produced using an operation called crossover, whereby each child gets genetic material from multiple parents, though crossover is not always required.

Figure 13:
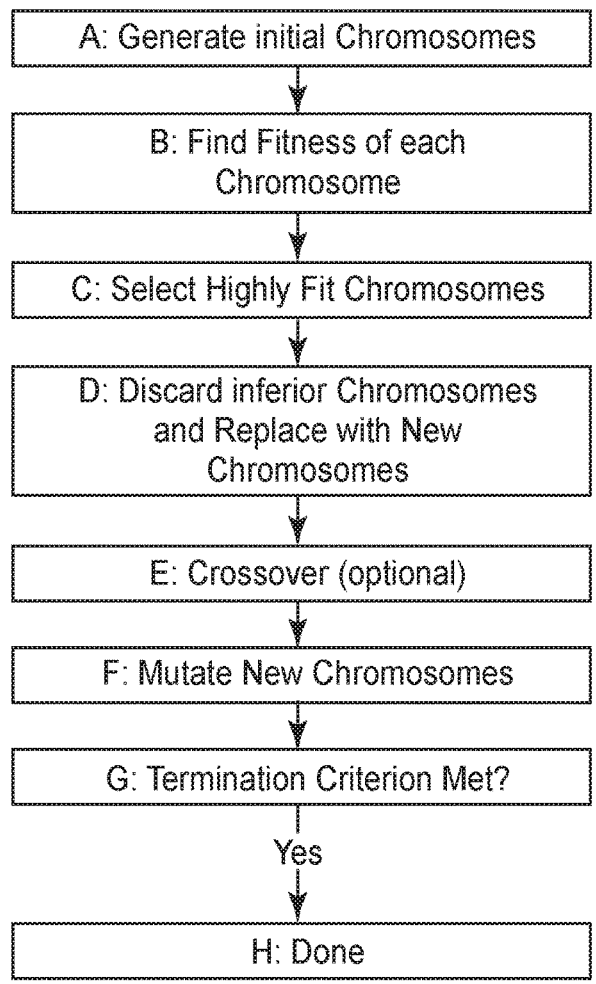
FIG. 13 depicts an exemplary genetic algorithm useful in some embodiments in the presently disclosed system.

In some embodiments, the chromosome is a list of points. Each point defines the vertex of a shape comprising the optical article having a plurality of retroreflective elements. The genetic algorithm favors geometries with high fitness (i.e. in this case, with fitness that is most nearly equal to 1.0). Geometries with high fitness tend to stay in the population, and geometries with low fitness tend to be excluded from the population due to the selection operation. FIG. 13 describes the genetic algorithm.

The population of chromosomes can be initialized randomly or initialized using pre-evolved chromosomes. The population may alternatively be initialized using the top N most-fit chromosomes from a set of thousands of randomly generated chromosomes. Similarly to the numerical optimization algorithm, the genetic algorithm uses the saliency objective function. The objection function can be modified to impose either hard or soft constraints on the design. Hard constraints guarantee compliance by the design. Soft constraints are used by the GA to "nudge" designs toward desirable attributes, but do not entirely preclude outlier designs.

Height and Width

Area (minimum and/or maximum—to comply with ANSI standards)

Presence of retroreflective elements in certain areas (i.e. to enforce presence of material on the shoulders for ANSI standards compliance)

Apply a mask to the design, to define the region of vest

We replace the chromosomes with the lowest fitness with copies of the chromosomes that have the highest fitness. See Steps C and D in FIG. 11. This can be done in various ways. In some embodiments, Single Tournament Selection is used with a tournament size of 4. This approach requires random assignment of each chromosome to a group of 4. The two inferior chromosomes are replaced with copies of the two superior chromosomes in that group. These copies may be exact replicas of the two superior parents or each child may be created using some genetic material from each parent. This later approach is called crossover (see Step E in FIG. 13). The children are then mutated (see Step F in FIG. 13). In the case of our proof-of-concept implementation, mutation involves randomly perturbing one or more [x, y] vertices in our chromosome.

Figure 12:
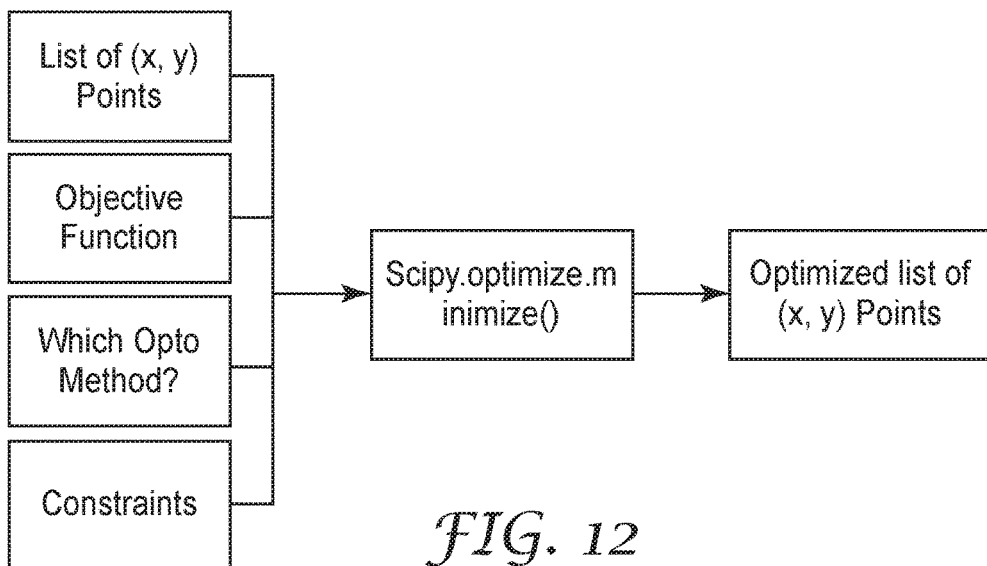
FIG. 12 shows an exemplary function that can be used for optimizing designs in the presently disclosed system.

Finally, determination is made as to whether the termination criterion has been met (see Step G in FIG. 13). Termination of the algorithm can be done after a predetermined number of generations. Alternatively, termination of evolution can be done after a chromosome appears with at least a minimum threshold of fitness. FIG. 12 shows an example input chromosome (left) and an example output chromosome (right).

Figure 14:
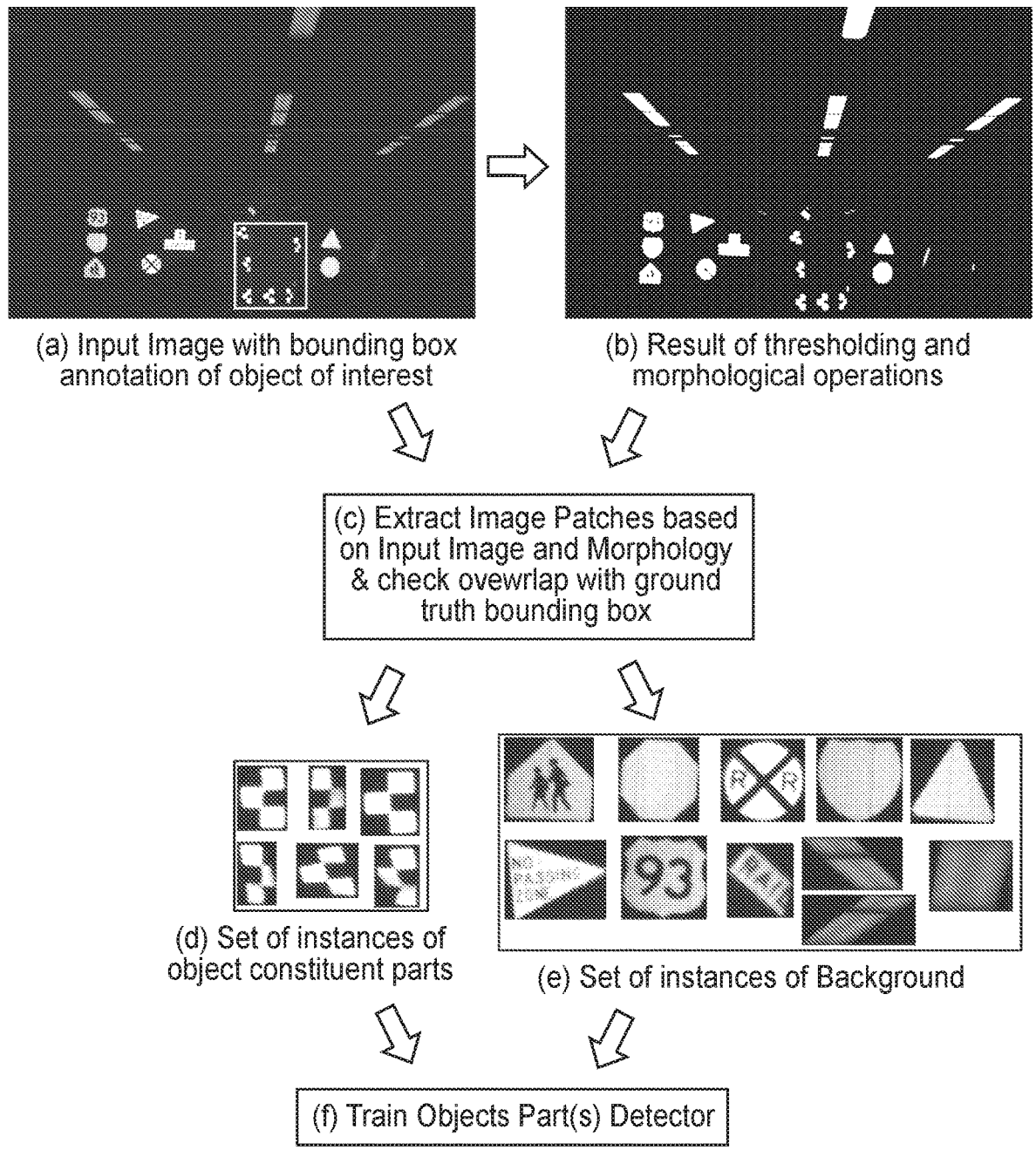
FIG. 14 depicts an embodiment for a workflow for a single image instance useful in some embodiments in the presently disclosed system.

The present disclosure also provides a system and method to exploit retroreflection for training of an object part detector. Optical articles with retroreflective properties appear bright in images where a light source is projected on them. Therefore, when images of these optical articles are intensity-thresholded, the object may appear as a connected component in the resulting binary image. In the present disclosure, this property is used to segment (if there are any) parts of an optical article. The sequence of steps to perform this methodology is described here and a sample workflow for a single instance of the optical article is depicted in FIG. 14:

An input image is provided. The image is annotated with the bounding box location of the entire object of interest (such as an optical article) (as shown in step (a) in FIG. 14).

Note that the annotation does not include any information e.g. count or location of the parts of the object.

Intensity thresholding and morphological operations like closing which includes dilation and erosion are carried on the image.

These provide binary image (images if run for multiple thresholds) where connected components provide image patches. The set of image patches can be separated into two sets—all image patches which do not have any overlap with the bounding box annotation and constitute the background (as shown in step (e) in FIG. 14). The other set includes patches with some overlap with the ground truth annotation (as shown in step (d) in FIG. 14).

The set of patches with overlap can be pruned by using a sizing heuristic to eliminate noisy patches left behind as an artifact of morphology.

The set of constituent parts can include a pattern repeated across the object (as shown an example in step (a) in FIG. 14) or different parts. These can be discovered by a clustering algorithm which can determine the number of parts of the object. The number of constituent parts may be provided through human supervision also.

Finally, a detector model is trained for the discovered constituent part of the object (as shown in step (f) in FIG. 14). This model is trained to detect a specific part of the object of interest in a scene.

In some embodiments, a potential method of characterization of the presently disclosed optical articles having a plurality of retroreflective elements includes a distribution function. For example, it might be characterized in terms of retro-reflective elements or features (reflecting a given wavelength and/or polarization potentially with a particular intensity) with a certain distribution of sizes and a certain distribution of spacing and relative position of the component elements. This type of characterization might be utilized to enable additional capabilities such as object classification (e.g., one characterization associated with one class of object and another characterization associate with a second class of object) or to enable product authentication. It could also be characterized by a distribution generated from a non-dimensional ratio determined from the constellation. For example the size of a node divided by the distance to the next closest node.

In the present disclosure, only a portion of the optical article that is sufficient to accurately sample the distribution is required for categorization. For example if an optical article contains many elements, X, that are part of the constellation, only a small number of visible elements, n, may be required for a statistically significant sample of the population (i.e. n<<X.) This will improve the robustness of the categorization when the view of the article is partially occluded or distorted.

The presented disclosure also provides a system and method to exploit retroreflection for part based detection. The system combines two properties of optical articles, particularly with retroreflective properties:

under certain morphological operations on an intensity thresholded image of an optical article, the resulting connected components is likely to include the whole object that certain optical articles are composed of constituent parts or may be modified to be a composition of repeating parts and some of these parts would be visible when the optical article is partially visible in its pose or occluded by other objects.

These two properties can be used by running a monolithic detector to search for the complete object of interest (such as infrastructure, a garment, an accessory, or other objects on which the presently disclosed optical article is disposed) and combining it with a detector that looks for its constituent part(s). The sequence of steps to perform this methodology is depicted in FIG. 15 and described here:

The input to the system is an image of a scene where an object of interest (such as infrastructure, a garment, an accessory, or other objects on which the presently disclosed optical article is disposed) may be present along with detector models that are trained to find the whole optical article disposed on the object of interest and separately, its constituent parts. The optical article on the object may be completely visible or partially visible due to pose or occlusion.

Figure 15:
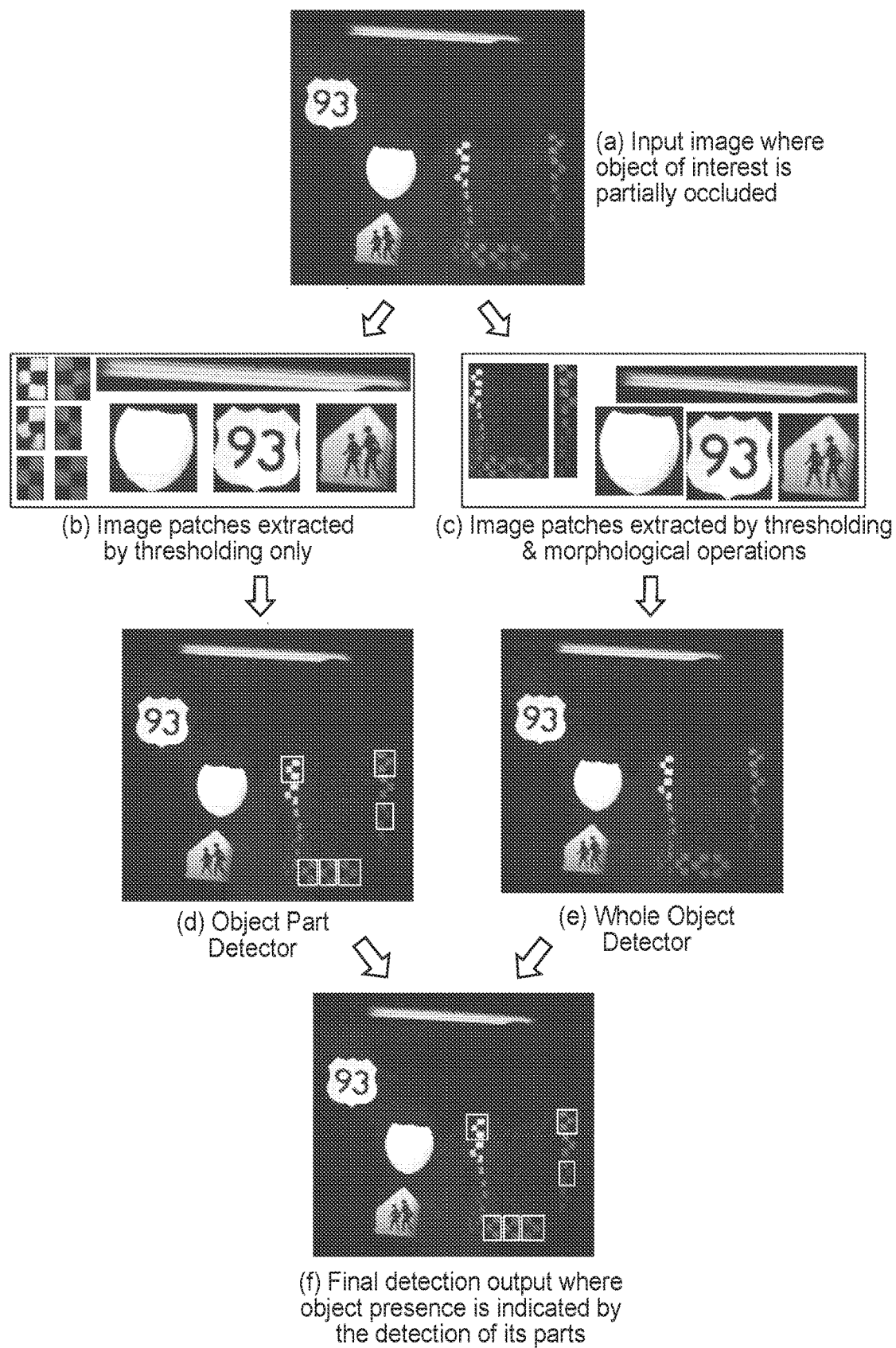
FIG. 15 depicts an embodiment for a workflow for an input image useful in some embodiments in the presently disclosed system.

Image patches which can include the optical article are generated in two ways: by intensity thresholding that help segment the constituent parts (as shown in step (b) FIG. 15) or thresholding combined with morphological operations (as shown in step (c) in FIG. 15).

The part(s) detector is run on the first pool of candidates as they are trained to look for the smaller compositional parts of the optical article (as shown in step (d) in FIG. 15) while the whole object detector is run on the image patches extracted after morphological operations (as shown in step (e) in FIG. 15).

Finally, the output of running the two different detector frameworks is combined. Even if the entire optical article may not be detected by the monolithic detector, the part based detector will discover some of the optical article thereby indicating presence of the article in the scene.

While one particular implementation of a computing system is described herein, other configurations and embodiments of computing systems consistent with and within the scope of the present disclosure will be apparent to one of skill in the art upon reading the present disclosure. Various modifications and alterations of the present disclosure will become apparent to those skilled in the art without departing from the scope and spirit of this invention.

EXAMPLES

| Designation | Description |
|---|---|
| ORASOL BLACK X55 | commercially available from BASF Corporation, Florham Park, NJ, USA |
| RE 195 | commercially available from Nazdar, Ink Technologies, Shawnee, KS USA |
| PARALOID B66 | commercially available from Dow Chemicals, Auburn MI, USA |
| DOWANOL DPMA | Dipropylene glycol methyl ether acetate), commercially available from Dow Chemicals, Auburn MI, USA |

Test Methods
Retroreflectivity Intensity

Retroreflective images were taken using either a visible or near-infrared light source.

Visible retroreflective photographs of samples were taken with a CMOSIS-based USB 3.0 color camera (Model acA2000-165uc from Basler AG, Ahrensburg Germany). The retrolight source was a 100 watt halogen lamp (Lowel Pro Light from Tiffen Inc, Hauppauge, N.Y.), combined with a ground glass light diffuser (Lowel ID-50H from Tiffen Inc, Hauppauge, N.Y.) and a beam splitter (Nerlite® DOAC-100-LED from Microscan, Renton, Wash.). The bead splitter was operated with the LED module removed. The camera was positioned on the center of the beam splitter and parallel to the center of the sample, with an entrance angle (defined as the angle between the retrolight source and the normal to the surface of the sample) of either 5 or 30 degree. The observation angle (defined as the angle between the retrolight/sample vector and the camera/sample vector) was approximately 0 degrees. Before the images were captured, the color intensity was calibrated using a white balance taken with a blank piece of print paper. The camera was set to an aperture setting of f/16 and images were taken at a viewing distance of 1.5 meters. The camera exposure time was adjusted to 1.3 and 1.8 milliseconds for 5 and 30 degree entrance angles, respectively.

Retroreflective images in the near-infrared wavelength range (at 850 and 940 nm) were taken with a USB 3.0 CCD camera (Model acA1300-30 um from Basler AG, Ahrensburg Germany), using a 8.5 mm/f1.3 lens (Edmund Optics Barrington, N.J.) attached to either an 850 nm or a 940 nm band filter (BP850-30.5 and BN940-30.5 filter, respectively, from Mid Optic, Palatine, Ill.), with an aperture of f/8 at a distance of 1.5 meters. The retrolight source was an 83 millimeter diameter infrared LED ring light. The camera was positioned on the center of the ring light and parallel to the center of the sample, with an entrance angle of either 5 or 30 degree to the sample adhered to a vertical rotation stand. The observation angle is approximately 1.5 degrees. The camera exposure time for the 850 nm measurements was adjusted 10 milliseconds for all images. The camera exposure time for the 940 nm measurements was adjusted to 35 and 17 milliseconds for the 940 nm measurements for 5 and 30 degree entrance angles, respectively.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded.

Retroreflective intensities were measured using pixel intensities from respective areas on the camera images. Commercially-available image processing software (ImageJ 1.48V freeware from the National Institutes of Health, Washington, D.C., obtainable through https://imagej.nih.gov/ij/) was used to calculate pixel intensities. An area of approximately 60×120 pixels was used for each region, and the minimum, maximum and mean pixel intensity were recorded. The pixel intensity range from low to high is 0 to 255, respectively.

Transmission Measurements

Optical transmission spectra in both the visible and near-infrared wavelength ranges were measured using an optical spectrophotometer (UltrascanPro from Hunter Associates Laboratory Reston, Va.)

Coefficient of Retroreflectivity

Retroreflectivity was measured using the test criteria described in ASTM E810-03 (2013)—Standard Test Method for Coefficient of Retroreflective Sheeting ($R_A$) using the Coplanar Geometry at 0.2° observation angle and 5° entrance angle, i.e. 0.2/5° angle. Retroreflective units are reported in cd/lux/m².

32-angle retroreflectivity measurement followed ANSI/ISEA 107-2010 standard.

Example 1

Commercially available retroreflective materials available from 3M Company, St. Paul, Minn., under the designation "SCOTCHLITE 8726" and "SCOTCHLITE 680-10" were used. A strip 10 cm×2 cm was obtained of each product. The strips were placed parallel on a horizontal surface with a 5 cm separation between the strips. The Coefficient of Retroreflectivity, $R_A$, was measured per ASTM D810-03 standard test method and are reported below for each material.

$R_A$ of SCOTCHLITE 8726=484
$R_A$ of SCOTCHLITE 680-10=114

A machine vision system, such as the presently disclosed optical system, will detect a differences in the $R_A$ of the two samples. Such difference in measured values along with the size, shape and relative placement of the two strips can be used as input into an algorithm, where the output of the algorithm signifies specific information and action recommendations.

Comparative Example 1

Two strips: 10 cm×2 cm of SCOTCHLITE 8726 were obtained. The two strips were placed parallel on a horizontal surface with a 5 cm separation between the strips. The Coefficient of Retroreflectivity, $R_A$, was measured per ASTM D810-03 standard test method and is reported below for both strips.

$R_A$ of top strip: 514
$R_A$ of bottom strip: 493

The difference between the two measured values is statistically too small to trigger detection by an optical system.

Example 2

Coating formulations were developed to provide a combination of visible light attenuation and a range of optical density (absorption) in the near-IR wavelength range.

Coating Details

Coating Solution 1

4 grams of PARALOID B66 was dissolved in 10 grams of DOWANOL DPMA in a glass vial. 3 grams of ORASOL BLACK X55 was dissolved in 1 gram of MEK and 9 grams of RE195 in another glass vial. Both were mixed together to form Coating Solution 1.

Coating Solution 2

4 grams of PARALOID B66 was dissolved in 10 grams of DOWANOL DPMA in a glass vial. Next 3 grams of RE195 was added, then followed by 3 gram addition of YMF-02A. All the contents were mixed using a vortex mixer to form coating solution 1.

Coating Process

Samples were prepared by coating Coating Solution 1 on the primed side of PET with Meyer Rod #12, followed by drying in a convection oven at 70° C. for 10 minutes. Following this Coating Solution 2 was coated on the reverse side of the PET film. Different coating thicknesses were obtained by using different Meyer rods #16, #5 and #3 to obtain IR filters 3, 8 and 9, respectively. IR Filter 1 was coated only on the primed side. All the coatings were dried at 70° C. for another 10 min.

Coating for Example 2A: Coating 1 thickness corresponding to Meyer Rod 12 on top side of PET; Coating 2 thickness corresponding to Meyer Rod #16

Coating for Example 2B: Coating 1 thickness corresponding to Meyer Rod 12 on top side of PET; Coating 2 thickness corresponding to Meyer Rod #5

Coating for Example 2C: Coating 1 thickness corresponding to Meyer Rod 12 on top side of PET; Coating 2 thickness corresponding to Meyer Rod #5

Coating for Example 2D: Coating 1 thickness corresponding to Meyer Rod 12 on top side of PET; No coating on reverse side.

Figure 16:
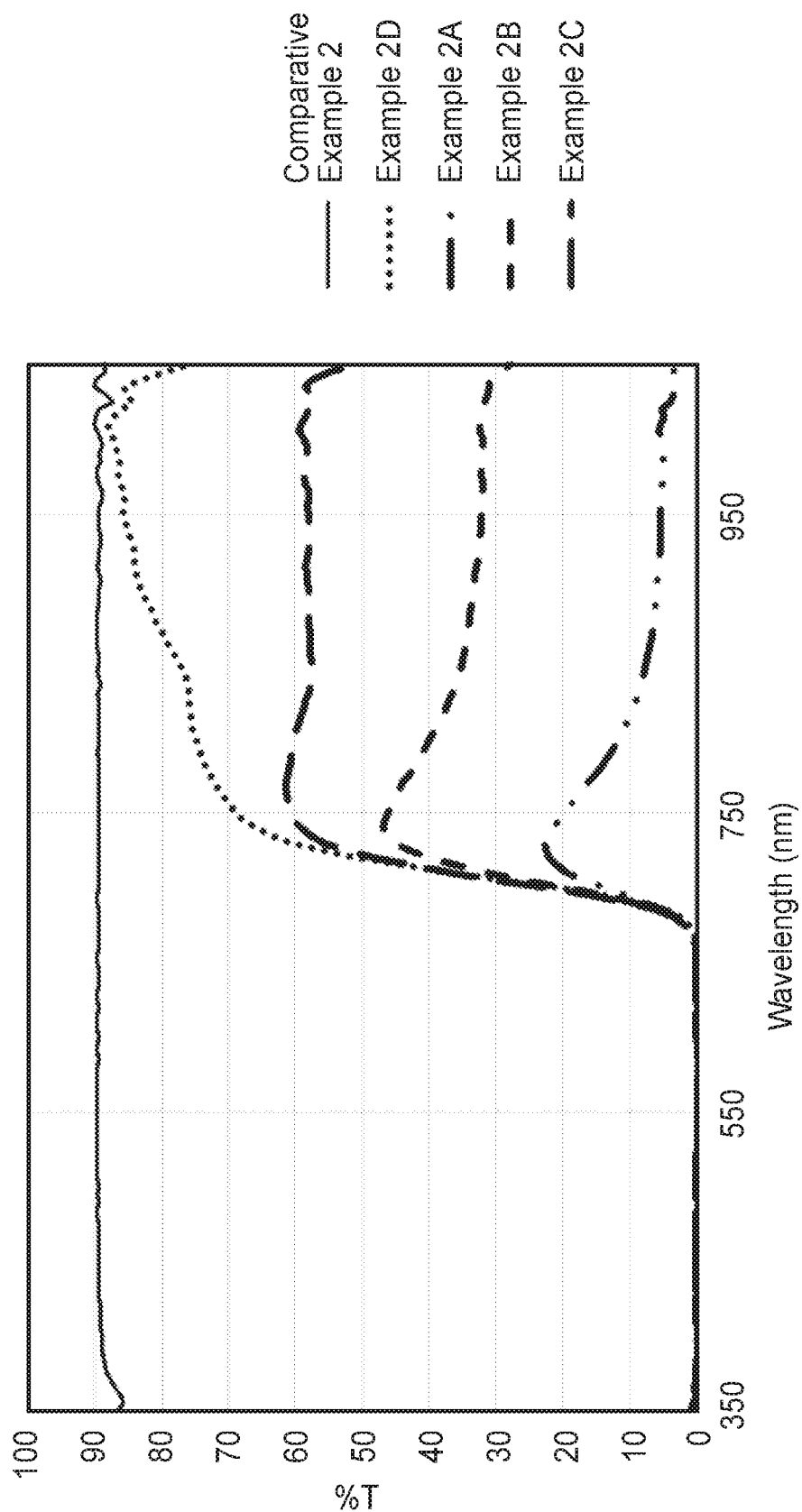
FIG. 16 shows transmission spectra for coated films related to Examples 2A-2D and Comparative Example 2.
Figure 17:
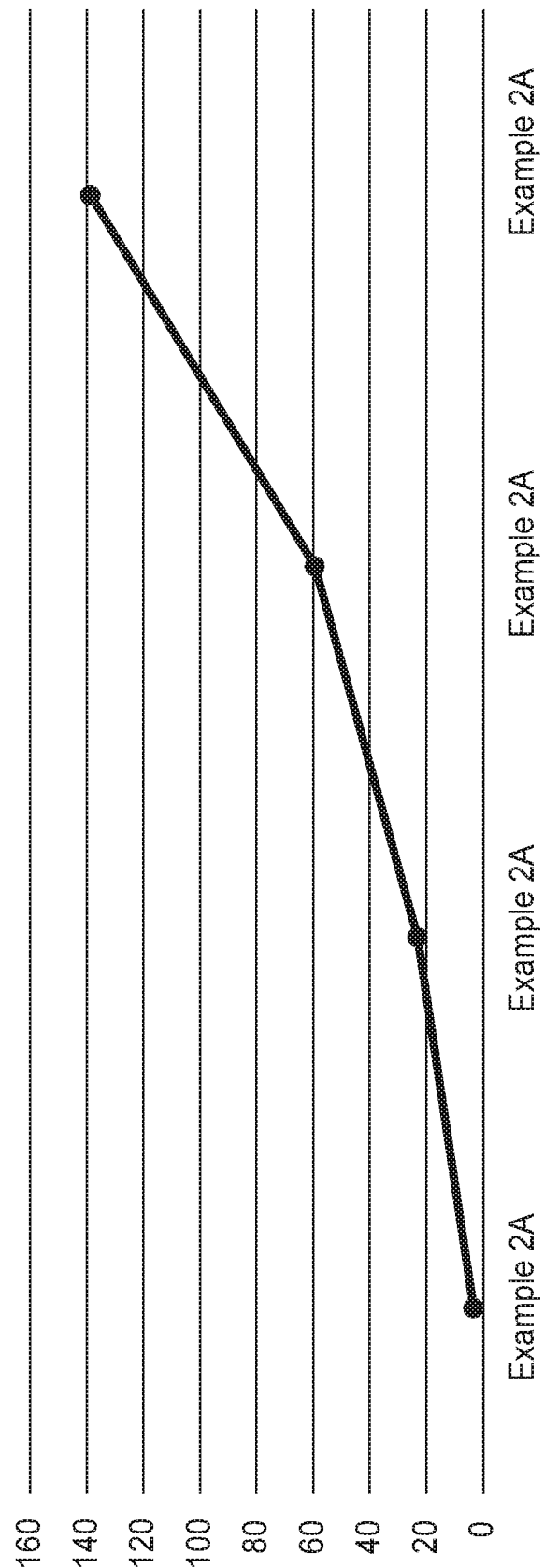
FIG. 17 shows retroreflected pixel intensity for Examples 2A-2D.
Figure 18:
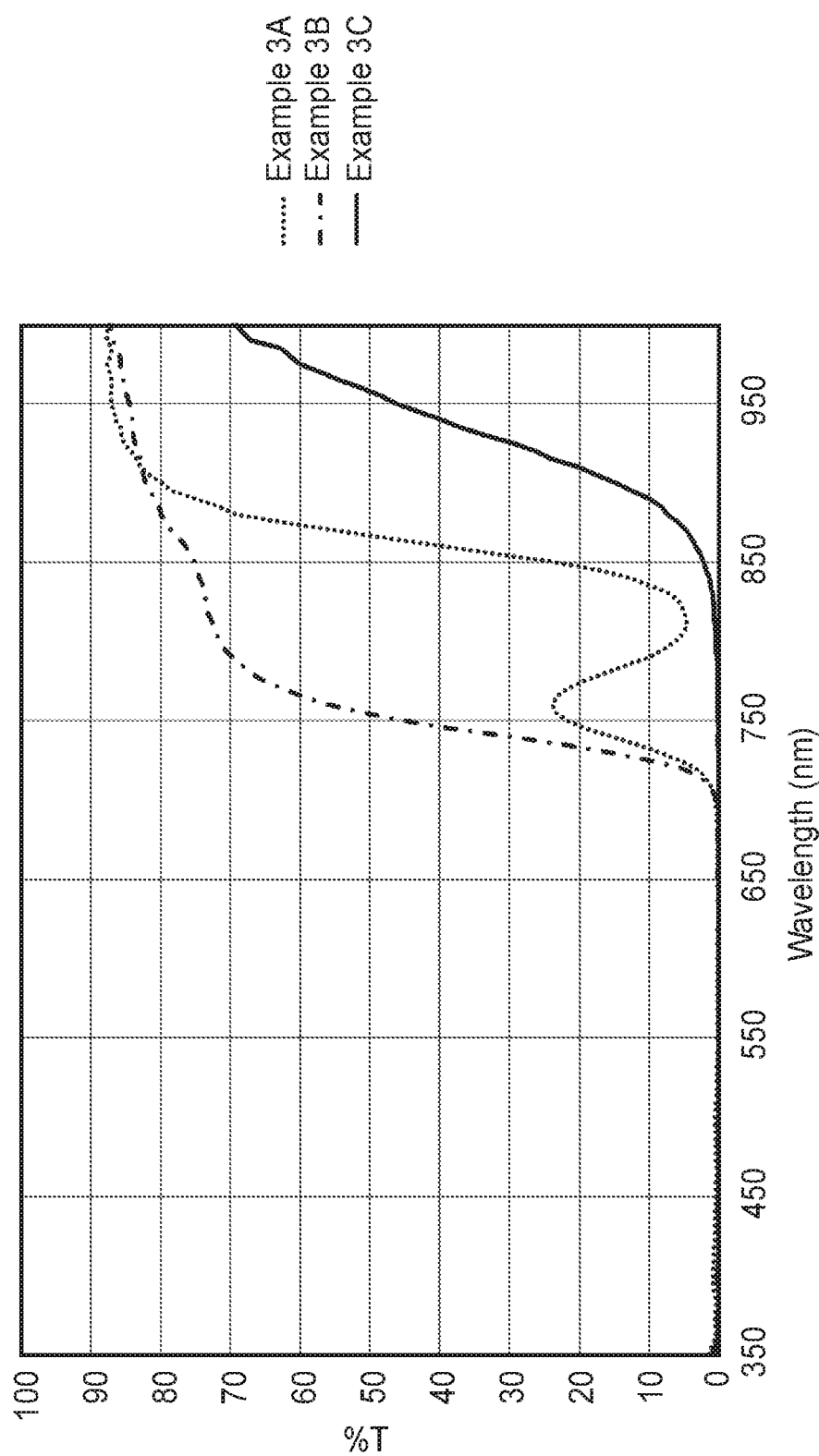
FIG. 18 shows transmission spectra for coated films related to Examples 3A-3C.

FIG. 16 shows the transmission spectra for coated films.

Arrays of retroreflective elements were prepared by using the respective coated PET films as an overlay film on top of segments of a commercially-available microprismatic retroreflective sheeting (3M PRXF2340 Gray Metallized Prismatic Reflective Sheeting) Conspicuity Marking Film.

The relative retroreflective intensity was measured using image processing on digital retroreflective images of arrangements of Examples 2A through 2D. Table 1 shows the visible and near-infrared retroreflective intensity. The examples provide essentially no intensity in the visible range and demonstrate a wide intensity range in the near-IR (940 nm).

TABLE 1

| | Wavelength range | Minimum Retroreflective Pixel Intensity | Maximum Retroreflective Pixel Intensity | Mean Retroreflective Pixel Intensity | Comment |
|---|---|---|---|---|---|
| Example 2A | Visible | 2 | 14 | 6.4 | Visible signal blocked |
| Example 2A | IR (940 nm) | 2 | 16 | 3.7 | IR (940 nm) signal blocked |
| Example 2B | Visible | 1 | 13 | 7.1 | Visible signal blocked |
| Example 2B | IR (940 nm) | 17 | 32 | 23.5 | IR (940 nm) partially transmitted |
| Example 2C | Visible | 2 | 12 | 7.1 | Visible signal blocked |
| Example 2C | IR (940 nm) | 20 | 87 | 59.8 | IR (940 nm) partially transmitted |
| Example 2D | Visible | 3 | 17 | 8.7 | Visible signal blocked |
| Example 2D | IR (940 nm) | 105 | 173 | 139.1 | IR (940 nm) signal transmitted |

Comparative Example 2

An overlayer comprising a PET film with no coatings was also included in the testing. Arrays of retroreflective elements were prepared by using the PET film as an overlay film on top of segments of a commercially-available microprismatic retroreflective sheeting (3M PRXF2340 Gray Metallized Prismatic Reflective Sheeting) Conspicuity Marking Film. For all of the samples in the array, the retroreflective intensity showed essentially no variation from element to element. The retroreflected pixel intensity was constant, approximately 200 in the visible range, and approximately 190 at 940 nm.

Example 3

Coating formulations were developed to provide a combination of visible light attenuation and a range of optical density (absorption) at different wavelengths within the near-IR wavelength range.

Example 3A 4 grams of PARALOID B66 was dissolved in 10 grams of DOWANOL DPMA in a glass vial. 3 grams of ORASOL BLACK X55 was dissolved in 1 gram of MEK and then added to 9 grams of RE195 in another glass vial. The contents were combined and mixed by hand. 1.5 grams of this mixture was added to 40 milligrams of IR-14 and the contents were mixed by hand.

The suspension was then coated onto a tinted PET film with Meyer Rod #20. After coating, the film was dried at 70° C. for 10 min.

Example 3B 4 grams of PARALOID B66 was dissolved in 10 grams of DOWANOL DPMA in a glass vial. 3 grams of ORASOL BLACK X55 was dissolved in 1 gram of MEK and then added to 9 grams of RE195 in another glass vial. The contents were combined and mixed by hand The suspension was then coated onto a tinted PET film with Meyer Rod #20. After coating, the film was dried at 70° C. for 10 min.

Example 3C

LUMOGEN BLACK FK4281 was milled and dispersed with a polymeric dispersant in 2-butoxyethyl acetate. 5 grams of this dispersion was mixed with 9 grams of a 33 wt % solution of PARALOID B66 in DOWANOL DPMA and 5 grams of RE195. The suspension was then coated onto a tinted PET film with Meyer Rod #20. After coating, the film was dried at 70° C. for 10 min.

FIG. 3 shows the transmission spectra for coated films.

Arrays of retroreflective elements were prepared by using the respective coated PET films as an overlay film on top of segments of a commercially-available microprismatic retroreflective sheeting (3M PRXF2340 Gray Metallized Prismatic Reflective Sheeting) Conspicuity Marking Film.

Images of the retroreflective arrays were taken in the visible range and at two (850 and 940 nm) infrared wavelengths. The relative retroreflective intensity was measured using image processing on digital retroreflective images of arrangements of Examples 3A through 3C. Table 2 shows the visible and near-infrared retroreflective intensity. The examples provide essentially no intensity in the visible regime and demonstrate a wide intensity range with wavelength sensitivity in the near-IR.

TABLE 2

Retroreflective intensity for visible and IR wavelengths

| | Wavelength range | Minimum Retroreflective Pixel Intensity | Maximum Retroreflective Pixel Intensity | Mean Retroreflective Pixel Intensity | Comment |
|---|---|---|---|---|---|
| Example 3A | Visible | 3 | 15 | 8.5 | Visible signal blocked |
| Example 3A | IR (850 nm) | 13 | 60 | 21.6 | IR (850 nm) signal blocked |
| Example 3A | IR (940 nm) | 99 | 165 | 135.4 | IR (940 nm) signal transmitted |
| Example 3B | Visible | 3 | 19 | 9.6 | Visible signal blocked |
| Example 3B | IR (850 nm) | 79 | 138 | 108.9 | IR (850 nm) partially transmitted |
| Example 3B | IR (940 nm) | 103 | 159 | 132.5 | IR (940 nm) transmitted |
| Example 3C | Visible | 1 | 14 | 7.2 | Visible signal blocked |
| Example 3C | IR (850 nm) | 5 | 10 | 6.1 | IR (850 nm) blocked |
| Example 3C | IR (940 nm) | 25 | 56 | 36.2 | IR (940 nm) partially transmitted |

Comparative Example 3

An overlayer comprising a PET film was also included in the testing. Arrays of retroreflective elements were prepared by using the PET film as an overlay film on top of segments of a commercially-available microprismatic retroreflective sheeting (3M PRXF2340 Gray Metallized Prismatic Reflective Sheeting) Conspicuity Marking Film. For all of the samples in the array, the retroreflective intensity showed essentially no variation from element to element. The retroreflected pixel intensity was constant, approximately 192 in the visible range, 181 at 850 nm and 185 at 940 nm.

What is claimed is:
1. An optical article that is deformable in the form of shrinking or expanding or both, comprising a data rich plurality of retroreflective elements that are configured in a spatially defined arrangement, wherein the plurality of retroreflective elements comprise retroreflective elements hav- ing at least two different retroreflective properties, wherein data rich means information that is readily machine interpretable.

2. The article of claim 1 wherein the data rich plurality of retroreflective elements are configured in a repeating spatially defined arrangement such that the information is interpretable even when the portion of the retroreflective elements are occluded.

3. The article of claim 1 wherein deformation comprises deforming of a garment on which the optical article is mounted.

4. The article of claim 1 wherein the deformation causes a spacing change between at least two of the retroreflective elements.

5. The article of claim 1 wherein the deformation is reversible.

6. The article of claim 1 wherein the at least two different retroreflective properties are at least two different retroreflective intensity values.

7. The article of claim 1 wherein the at least two different retroreflective properties at least two different wavelengths.

8. The article of claim 1 wherein the retroreflective property changes in response to at least one of a change in temperature, moisture, mechanical deformation, or radiation.

9. The article of claim 1, further comprising a garment.

10. The article of claim 9, wherein the retroreflective elements are disposed on the garment.

* * * * *

UNITED STATES PATENT AND TRADEMARK OFFICE
CERTIFICATE OF CORRECTION

PATENT NO. : 11,651,179 B2
APPLICATION NO. : 16/486311
DATED : May 16, 2023
INVENTOR(S) : Michael A McCoy Page 1 of 1

It is certified that error appears in the above-identified patent and that said Letters Patent is hereby corrected as shown below:

In the Claims

<u>Column 19</u>
Line 21, In Claim 7, after "retroreflective properties", insert --are--.

Signed and Sealed this
Twenty-fourth Day of October, 2023

Katherine Kelly Vidal
*Director of the United States Patent and Trademark Office*